(12) United States Patent
Stringer et al.

(10) Patent No.: US 10,048,848 B2
(45) Date of Patent: *Aug. 14, 2018

(54) MAGNIFICATION INTERFACE WITH INDEPENDENT POINTER SIZING

(71) Applicant: Freedom Scientific, Inc., St. Petersburg, FL (US)

(72) Inventors: Anthony Bowman Stringer, Tarpon Springs, FL (US); Garald Lee Voorhees, Tampa, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 318 days.

This patent is subject to a terminal disclaimer.

(21) Appl. No.: 14/941,128

(22) Filed: Nov. 13, 2015

(65) Prior Publication Data

US 2016/0070459 A1    Mar. 10, 2016

Related U.S. Application Data

(60) Continuation of application No. 13/775,811, filed on Feb. 25, 2013, now Pat. No. 9,235,314, which is a (Continued)

(51) Int. Cl.
*G06F 3/048* (2013.01)
*G06F 3/0481* (2013.01)
*G06F 3/0484* (2013.01)

(52) U.S. Cl.
CPC ........ *G06F 3/04847* (2013.01); *G06F 3/0481* (2013.01); *G06F 3/04812* (2013.01);
(Continued)

(58) Field of Classification Search
CPC .... G06F 3/048; G06F 3/0481; G06F 3/04812; G06F 3/04847; G06F 2203/04805; G06F 2203/04806

See application file for complete search history.

(56) References Cited

U.S. PATENT DOCUMENTS 6,714,218 B1    3/2004   Bian
7,586,481 B1    9/2009   Paquette et al.
(Continued)

FOREIGN PATENT DOCUMENTS

EP    2449456          5/2012
WO    2011002981 A2    1/2011

OTHER PUBLICATIONS

Algorithmic Implementations, Inc., ZoomText 8.1 User's Guide, 2004, pp. 38-47.
(Continued)

*Primary Examiner* — Amy M Levy
(74) *Attorney, Agent, or Firm* — Andriy Lytvyn; Anton J. Hopen; Smith & Hopen, P.A.

(57) ABSTRACT

A computer program for rendering a magnified graphic user interface (GUI) establishes an initial magnification level for the graphic user interface and the pointing indicia. The GUI and the pointing indicia are magnified in synchronization until the magnification convergence point is reached. At magnification levels above the convergence point, magnification of the GUI and the pointing indicia becomes decoupled, and only GUI is magnified while the pointing indicia remain at the convergence magnification level. If the GUI magnification level falls below the convergence point, the magnification of GUI and the pointing indicia is recoupled and magnification becomes synchronized. Floor and ceiling magnification values for the pointing indicia may also be established.

16 Claims, 23 Drawing Sheets

Related U.S. Application Data division of application No. 12/828,735, filed on Jul. 1, 2010, now abandoned.

(60) Provisional application No. 61/222,714, filed on Jul. 2, 2009.

(52) U.S. Cl.
CPC .... *G06F 3/048* (2013.01); *G06F 2203/04805* (2013.01); *G06F 2203/04806* (2013.01)

(56) References Cited

U.S. PATENT DOCUMENTS

| | | |
|---|---|---|
| 7,916,157 B1 | 3/2011 | Kelley et al. |
| 8,074,181 B2 | 12/2011 | Zaman et al. |
| 8,176,438 B2 | 5/2012 | Zaman et al. |
| 2004/0250216 A1 | 12/2004 | Roman et al. |
| 2005/0204295 A1 | 9/2005 | Voorhees et al. |
| 2006/0146075 A1 | 7/2006 | Weiss et al. |
| 2007/0013722 A1 | 1/2007 | Souza |
| 2007/0013723 A1 | 1/2007 | Souza et al. |
| 2007/0192718 A1 | 8/2007 | Voorhees et al. |
| 2007/0198942 A1 | 8/2007 | Morris |
| 2008/0148177 A1 | 6/2008 | Lang et al. |
| 2008/0195979 A1 | 8/2008 | Souza et al. |

OTHER PUBLICATIONS

Lewis, Personal Computers; A Mouse That Does More Tricks, New York Times, Apr. 27, 1993, p. C11.

JIJI Press Ltd., NEC Launches New Software to Magnify PC Screen Text, JIJI Press Eng. News Serv., Jul. 8, 2004.

International Search Report and Written Opinion dated Feb. 21, 2011 for International Application No. PCT/US2010/040752 with an International filing date of Jul. 1, 2010.

Preliminary Report on Patentability dated Jan. 12, 2012 for International Application No. PCT/US2010/040752 with an International filing date of Jul. 1, 2010.

Algorithmic Implementations, Inc., ZoomText 9.1 User's Guide, 2009.

Freedom Scientific BLV Group, LLC. MAGic User's Guide, Jan. 2007.

Extended European Search Report and European search opinion dated Jul. 20, 2016 for corresponding European patent application No. 10794756.6.

MAGNIFICATION INTERFACE WITH INDEPENDENT POINTER SIZING

CROSS REFERENCE TO RELATED APPLICATIONS

This application is a continuation of a U.S. Non-Provisional patent application Ser. No. 13/775,811, entitled "Magnification Interface with Independent Pointer Sizing" filed on Feb. 25, 2013, which is a divisional application of U.S. Non-Provisional patent application Ser. No. 12/828,735 filed on Jul. 1, 2010, which further claims priority to U.S. Provisional Patent Application No. 61/222,714 filed on Jul. 2, 2009.

FIELD OF INVENTION

This invention relates to low vision assistive software, and more particularly to a magnification application for a graphic user interface (GUI).

BACKGROUND OF THE INVENTION

Low vision individuals often require magnification of computer screen interfaces to discern text and images. Magnification systems may be built into the operating system itself or may comprise feature-rich, third-party products such as those sold under the MAGIC brand manufactured by Freedom Scientific, Inc., based in St. Petersburg, Fla.

A deficiency in the current state of the art is the over-magnification of the pointing indicia. Low vision users are often limited in the magnification they can impose because the pointing indicia are magnified in step with the entire GUI. Thus, at high magnification levels (i.e., exceeding 16-fold) pointing indicia become so large they obscure much of the GUI itself.

Another deficiency exists in the current state of the art wherein low vision users, depending on the application and their own preferences, may desire a larger or smaller cursor or caret to enhance productivity. For example, a low vision user might desire a mouse pointer for a spreadsheet application to be magnified to 2-fold while the same mouse pointer in a word processing application is easier to use at 4-fold magnification.

SUMMARY OF INVENTION

An embodiment of the present invention includes a method of rendering a magnified GUI including the steps of establishing a first magnification level for the GUI. The GUI includes the desktop and software applications that execute within the operating system. A second magnification level is established for pointing indicia. The pointing indicia may be a cursor or a caret. A cursor is the graphical image that represents the mouse and its movements. It can take many shapes including, but not limited to, an arrow for pointing, a hand, an hourglass, or an I-shaped text selector. The caret, on the other hand, is the blinking indicia that is used to enter text.

The magnified GUI is displayed at the first magnification level. Application program interface messaging for the operating system is monitored and calls for a system pointer identifier (such as a system pointer handle) are intercepted. Alternately or in conjunction with API intercepts, the magnification program may poll the operating system for current mouse pointer information, including but not limited to its position and shape. Instead of merely displaying the pointing indicia at the magnification level of the GUI, the pointing indicia is scaled, instead, to the second magnification level and subsequently displayed.

To load mouse pointers, in a MICROSOFT WINDOWS environment in which the invention may be used applications call the LoadCursor API function:

HCURSOR LoadCursor (HINSTANCE hInstance,LPCTSTR LPCTSTR lpCursorName);

If hInstance is NULL, then lpCursorName contains an identifier representing one of the standard system cursors. These values may include:

| Value | Meaning |
|---|---|
| IDC_APPSTARTING MAKEINTRESOURCE(32650) | Standard arrow and small hourglass |
| IDC_ARROW MAKEINTRESOURCE(32512) | Standard arrow |
| IDC_CROSS MAKEINTRESOURCE(32515) | Crosshair |
| IDC_HAND MAKEINTRESOURCE(32649) | Hand |
| IDC_HELP MAKEINTRESOURCE(32651) | Arrow and question mark |
| IDC_IBEAM MAKEINTRESOURCE(32513) | I-beam |
| IDC_ICON MAKEINTRESOURCE(32641) | Obsolete for applications marked version 4.0 or later. |
| IDC_NO MAKEINTRESOURCE(32648) | Slashed circle |
| IDC_SIZE MAKEINTRESOURCE(32640) | Obsolete for applications marked version 4.0 or later. Use IDC_SIZEALL. |
| IDC_SIZEALL MAKEINTRESOURCE(32646) | Four-pointed arrow pointing north, south, east, and west |
| IDC_SIZENESW MAKEINTRESOURCE(32643) | Double-pointed arrow pointing northeast and southwest |
| IDC_SIZENS MAKEINTRESOURCE(32645) | Double-pointed arrow pointing north and south |
| IDC_SIZENWSE MAKEINTRESOURCE(32642) | Double-pointed arrow pointing northwest and southeast |
| IDC_SIZEWE MAKEINTRESOURCE(32644) | Double-pointed arrow pointing west and east |
| IDC_UPARROW MAKEINTRESOURCE(32516) | Vertical arrow |
| IDC_WAIT MAKEINTRESOURCE(32514) | Hourglass |

If hInstance is not NULL, then lpCursorName contains either a numeric or string identifier representing a graphic image contained in the application's resources. LoadCursor returns a numeric handle to the cursor that was loaded. The foreground application selects the active cursor by calling the SetCursor function. This function takes one of the HCURSOR handles previously created by LoadCursor. By intercepting both of these functions, it is possible to keep track of the active cursor being used by an application. By intercepting the SetForegroundWindow function, it is possible to determine which application is in the foreground and hence, track which application's cursor is active system-wide.

An alternative method of obtaining the pointer shape under MICROSOFT WINDOWS includes the step of intercepting the drvSetPointerShape value between operating system and display device driver. Using drvSetPointerShape value is most appropriate for the fifteen (15) predefined (non-obsolete) cursor types available in the MICROSOFT WINDOWS application programming interface specification.

In an embodiment of the invention, the second magnification level is static. The GUI may be scaled to any magnification but the size of the pointing indicia remains the same.

In yet another embodiment of the invention, the second magnification level is preselected according to at least one or more software applications in focus. For example, a mouse cursor may be magnified to 4-fold for a word processor application but only magnified 2-fold by a spreadsheet application. The present invention intercepts API messaging to automatically switch second magnification levels based on the application in the foreground or in focus.

The second magnification level may be user-modifiable independently of the first magnification level. For example, a user may hold down a key combination while moving a mouse wheel to scale the magnification level of the GUI without affecting the magnification level of the pointing indicia. Alternatively, a different key combination may invoke magnification only for the pointing indicia. Yet another key combination may re-synchronize the GUI and pointing indicia magnification levels. Separate magnifications levels for cursors and carets may also be established.

Another embodiment of the invention intelligently applies a convergence value to optimize the relative magnification of the GUI and pointing indicia. The embodiment includes the steps of magnifying, in synchronization, both a background GUI and a foreground pointing indicia, establishing a magnification convergence value, responsive to a magnification level of the GUI exceeding the convergence value, decoupling synchronization and displaying the pointing indicia magnified at a lesser relative factor than the GUI magnification level, and responsive to a magnification level of the GUI below or equal to the convergence value re-coupling synchronization and displaying the pointing indicia magnified at a factor relative to the GUI magnification level.

The synchronization may be achieved by a linear, logarithmic, or step graph relationship. The convergence value may be derived from a number of factors including the magnification level of the pointing indicia. However, an alternate method is to derive the convergence value from a ratio of pointing indicia surface area against GUI surface area. This may be particularly useful as initial pointer size at 1-fold magnification of the GUI may be highly variable (i.e., 0.5×, 1.0×, 2.0×, 4.0×, etc. . . . ).

An embodiment of the invention may include having separate convergence values for cursors and carets. Steps to this embodiment include providing a first convergence value for a cursor and a second convergence value for a caret, magnifying the cursor in accordance with the first convergence value, and magnifying the caret in accordance with the second convergence value.

A user-selectable pointing indicia magnification adjustment may be provided to decouple the synchronization whereby the pointing indicia is magnified independently of the magnification level of the GUI background and the independently magnified pointing indicia is displayed to the user. The user-selectable pointing indicia magnification adjustment may include voice commands, keystrokes, mouse events, or the like.

In yet another embodiment of the invention, a user may wish to occasionally override the automatic convergence feature of the invention. Responsive to a first user-initiated event or adjustment, synchronization is decoupled to display the pointing indicia to a user-selectable level magnification level. Responsive to a second user-initiated event, synchronization is re-coupled to display the pointing indicia according to the convergence value.

In yet another embodiment of the invention, erratic pointer movement following a period of pointer inactivity temporarily scales the pointing indicia from a first to a second magnification level allowing the user to identify the location of the pointing indicia. The pointing indicia is then returned to the first magnification level. Erratic pointer movements are detected by monitoring mouse events for speed and direction of the pointer.

An embodiment of the invention may include one or more computer-readable media having computer-executable instructions for performing a method of running a software program on a computer, the computer operating under an operating system, the method including issuing instructions from the software program which include establishing a first magnification level for the GUI, establishing a second magnification level for a pointing indicia, displaying the magnified GUI at the first magnification level, receiving pointer-related information either by monitoring application program interface messaging, polling for current information, or a combination of both, scaling the pointing indicia to the second magnification level and displaying the pointing indicia.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

FIGS. 1-7 show GUI 10 displaying text 20, button control 30, mouse cursor 40 and GUI magnification level 50. At 1-fold GUI magnification in FIG. 1, mouse cursor 40 is shown at 1× magnification. However, under various embodiments of the invention, mouse cursor 40 could be reduced to lower magnifications (i.e., 0.5×) or increased to higher magnifications (i.e., 4×) while GUI 10 is still at 1-fold magnification.

Figure 1:
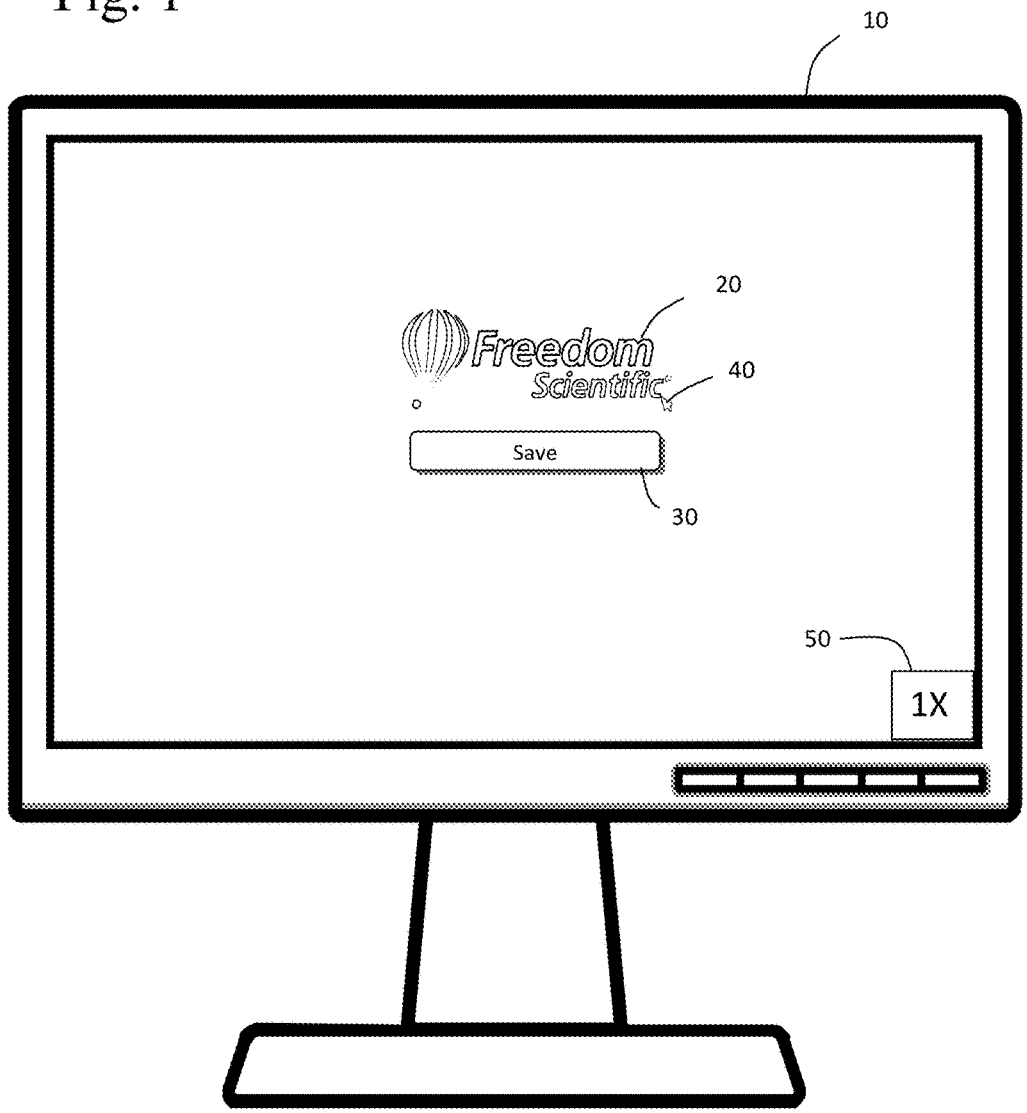
FIG. 1 is a conceptual view of a monitor displaying a GUI and a mouse cursor at 1-fold magnification.
Figure 2:
FIG. 2 is a conceptual view of a monitor displaying a GUI and a mouse cursor at 2-fold magnification.
Figure 3:
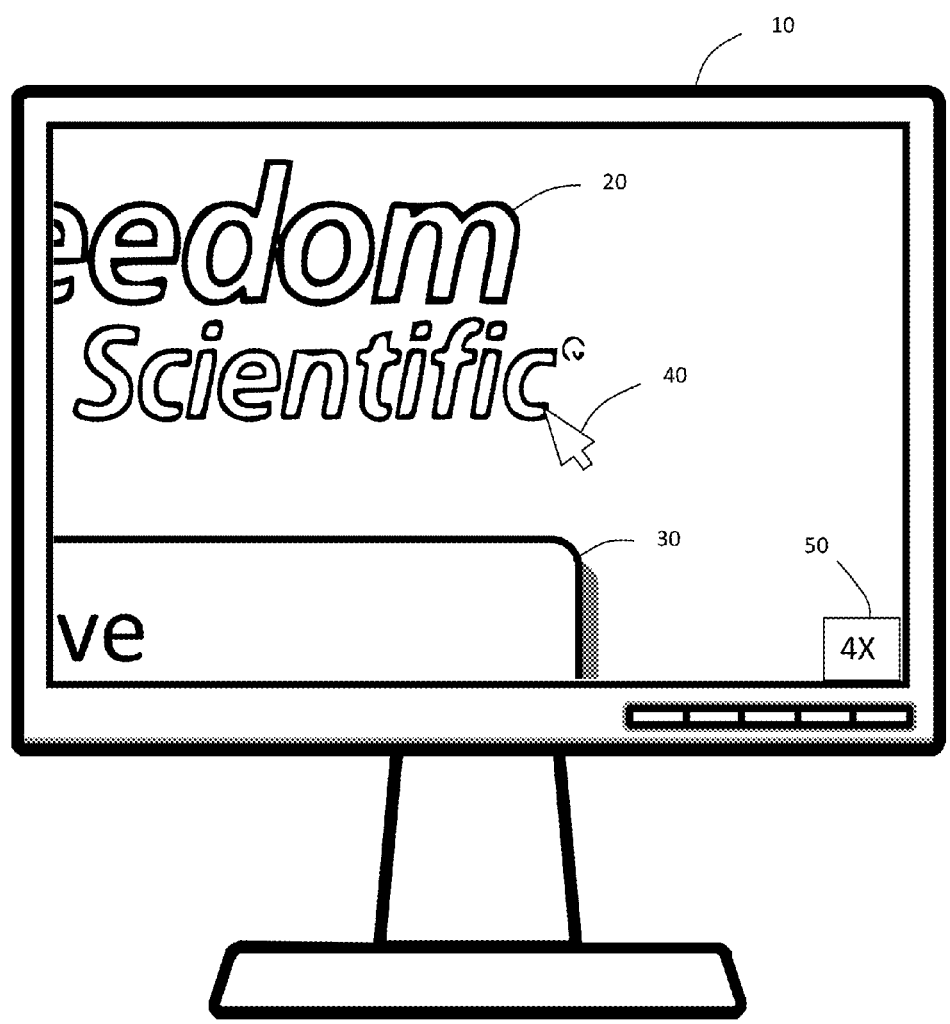
FIG. 3 is a conceptual view of a monitor displaying a GUI and a mouse cursor at 4-fold magnification.
Figure 4:
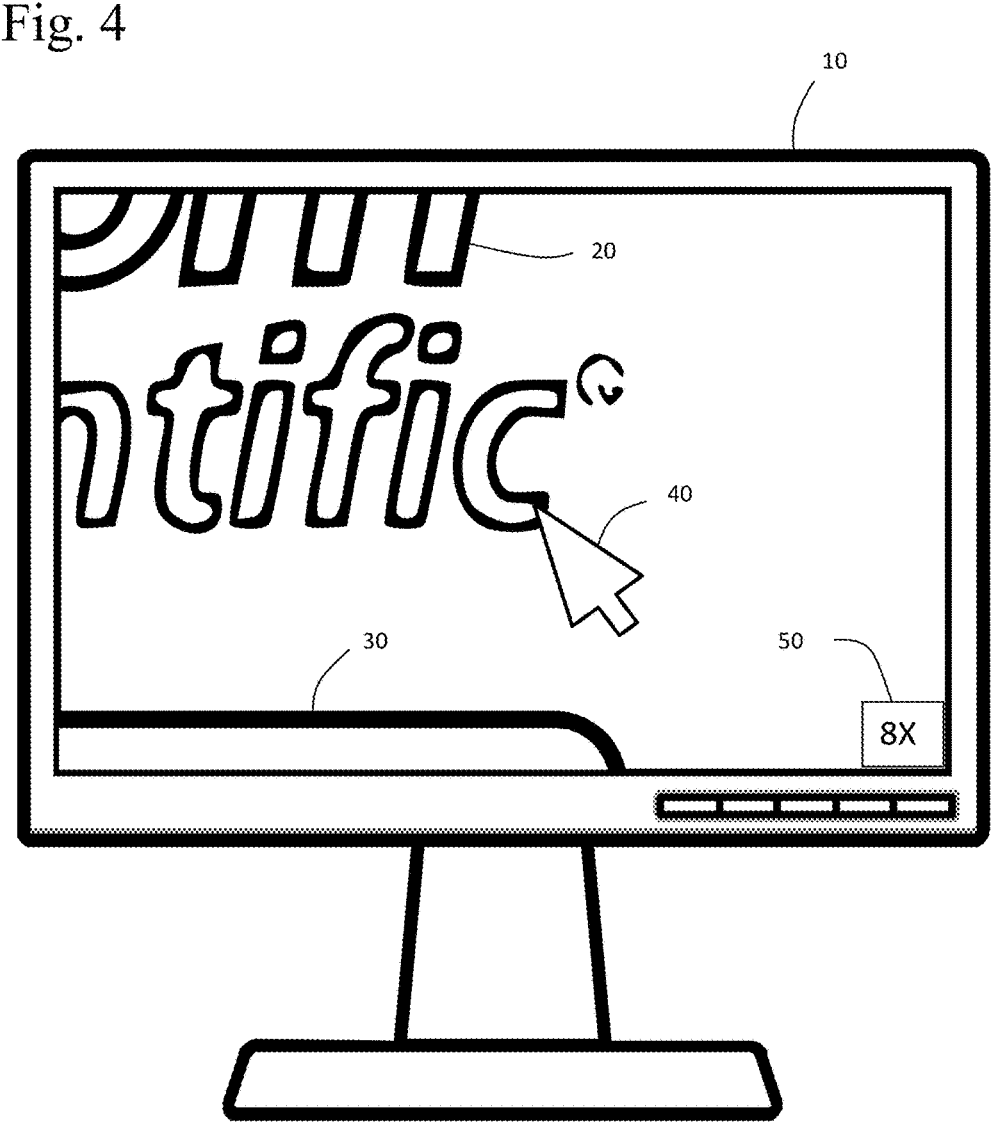
FIG. 4 is a conceptual view of a monitor displaying a GUI and a mouse cursor at 8-fold magnification.
Figure 5:
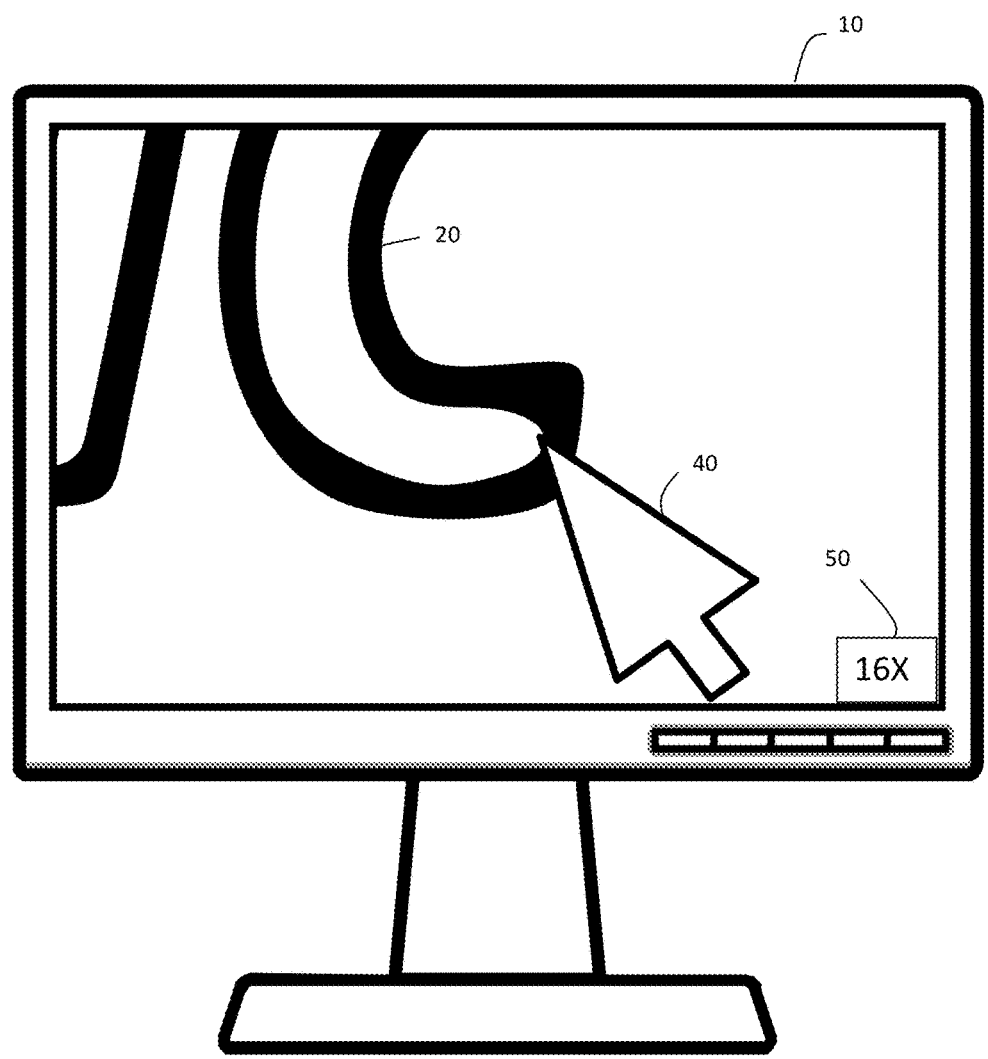
FIG. 5 is a conceptual view of a monitor displaying a GUI and a mouse cursor at 16-fold magnification.
Figure 6:
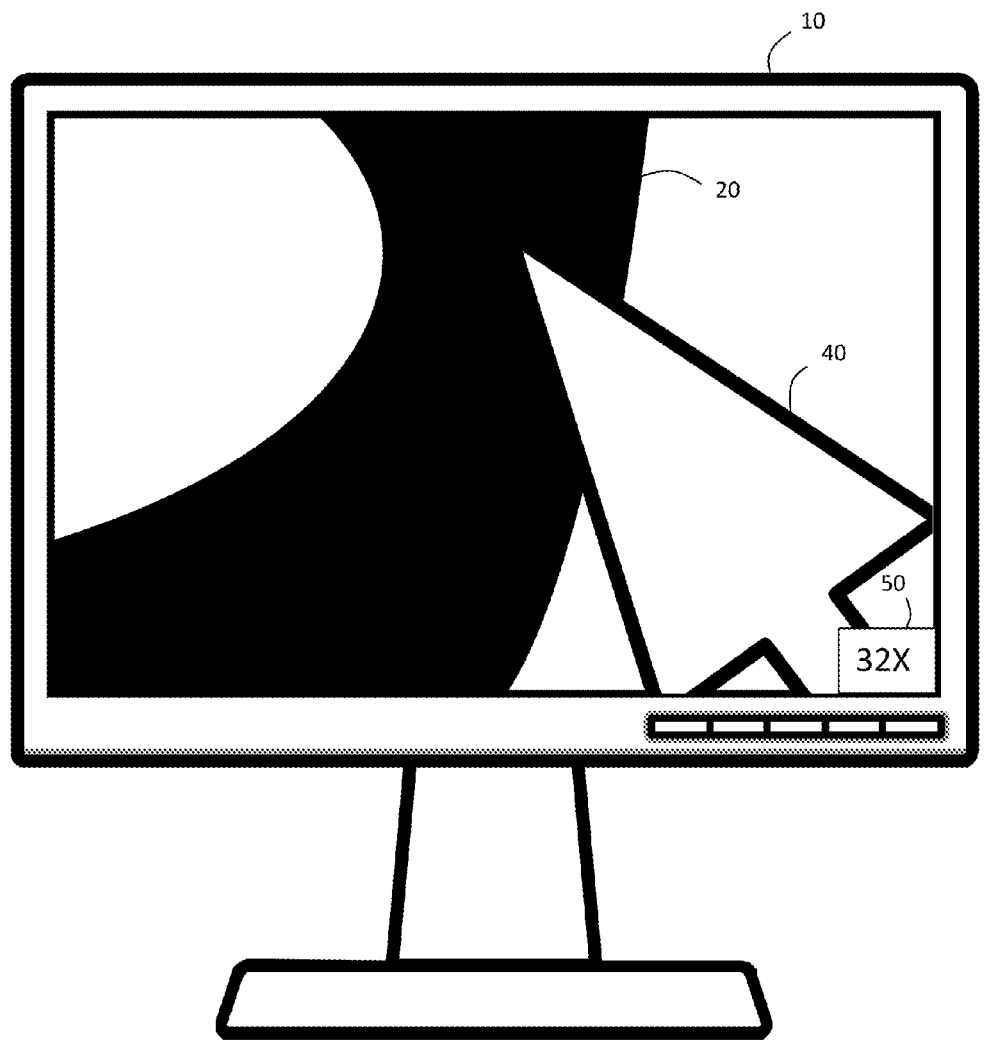
FIG. 6 is a conceptual view of a monitor displaying a GUI and a mouse cursor at 32-fold magnification.
Figure 7:
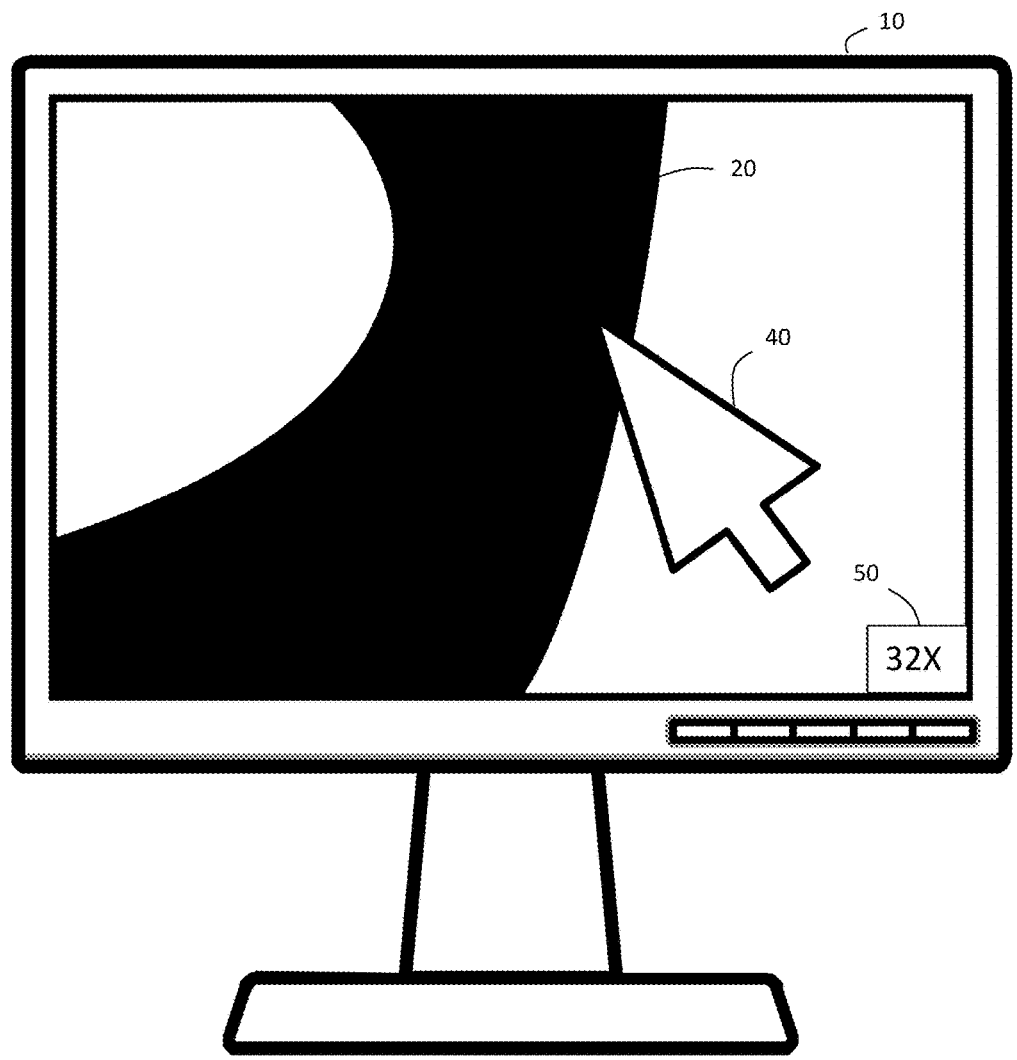
FIG. 7 is a conceptual view of a monitor displaying a GUI at 32-fold magnification and a mouse cursor at 16-fold magnification.

To illustrate an advantage of the present invention, FIGS. 1-6 show a 1-to-1 magnification level between GUI 10 and mouse cursor 40 as would be seen in the current state of the art. In FIG. 2, GUI 10 is magnified 2-fold and mouse cursor 40 is similarly magnified to 2× along with objects in GUI 10 such as text 20 and button control 30. In FIG. 3, GUI 10 is magnified 4-fold and mouse cursor 40 is also magnified to 4×. At 4-fold magnification, button control 30 and text 20 can no longer be entirely displayed within the magnified desktop area of GUI 10. In FIG. 4, GUI 10 is magnified 8-fold and mouse cursor 40 is also magnified to 8×. In FIG. 5, GUI 10 is magnified 16-fold and mouse cursor 40 is also magnified to 16×. In FIG. 6, GUI 10 is magnified 32-fold and mouse cursor 40 is also magnified to 32×. At this level of magnification, mouse cursor 40 provides questionable utility for the low vision user. In most positions, mouse cursor 40 itself cannot be entirely displayed on GUI 10 desktop and obscures other objects on the desktop. Thus, when mouse cursor 40 and GUI 10 are always magnified in 1-to-1 synchronization, less than desirable results may occur. However, in FIG. 7, GUI 10 is magnified 32-fold but mouse cursor 40 is only magnified to 16×. At 16× magnification, mouse cursor 40 maintains a higher level of utility to the user while the user may still have GUI 10 magnified to a very high level. Bifurcating the relative magnification of the pointing indicia (mouse cursor 40) and GUI 10 enables low vision users have meaningful tools to both comprehend the content of GUI 10 at various magnification levels as well as control it via mouse cursor 40.

FIGS. 8-14 show line charts that enumerate exemplary embodiments of the invention. These figures illustrate synchronization of pointing indicia and GUI and the decoupling and re-coupling of the synchronization depending on the magnification level of the GUI.

Figure 8:
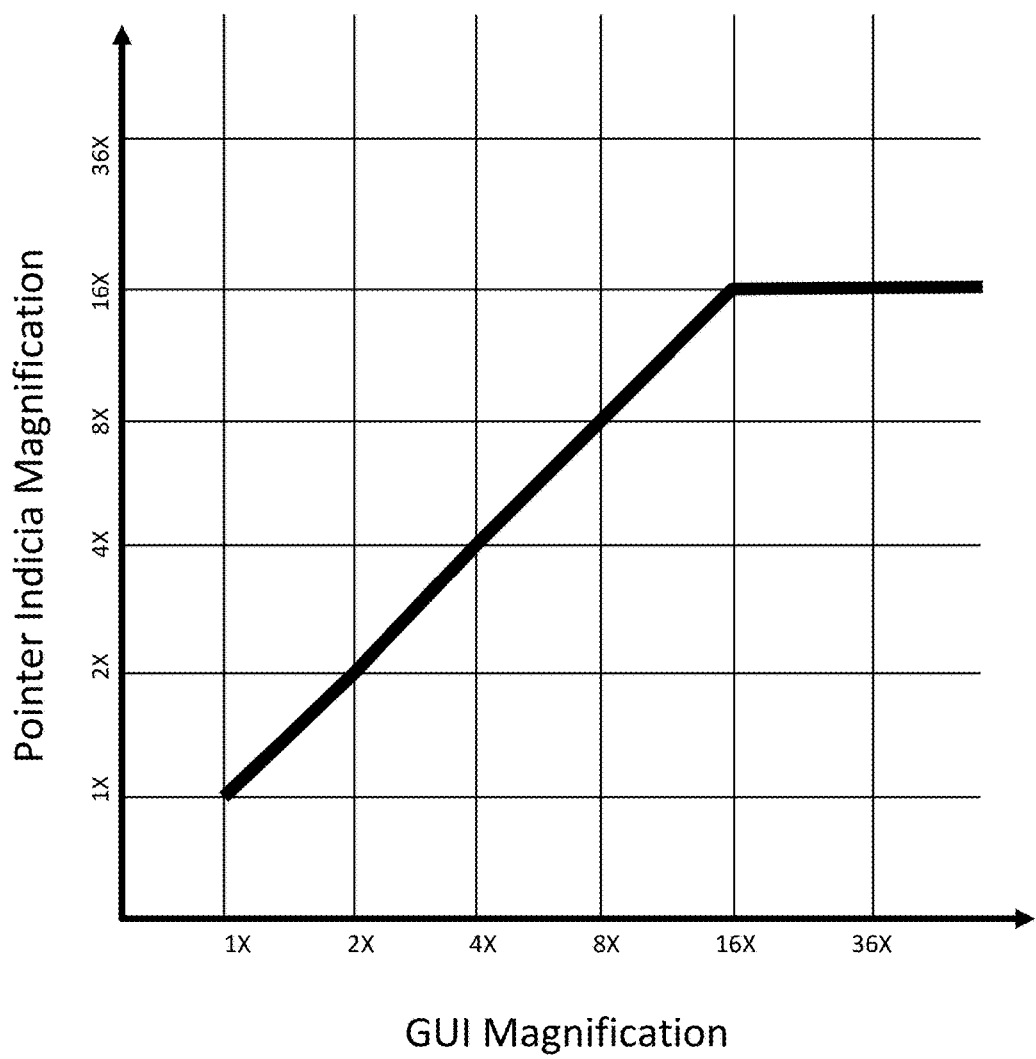
FIG. 8 is a line graph showing synchronization of pointer indicia and GUI at a 1-to-1 relationship until pointer indicia reaches a 16-fold magnification ceiling.

In FIG. 8, GUI magnification increases from 1-fold to 36-fold and above. Pointer indicia is magnified in-step at a 1-to-1 relationship until GUI magnification increases beyond 16-fold. At that point, pointer indicia reaches its ceiling value of 16× and no longer is magnified. Hence, the prior synchronization between GUI and pointer indicia magnification is decoupled. However, as GUI magnification drops back to 16-fold, pointer indicia and GUI synchronization is re-coupled to a 1-to-1 relationship. This relationship correlates with the illustrations in FIGS. 1-5, and 7.

Figure 9:
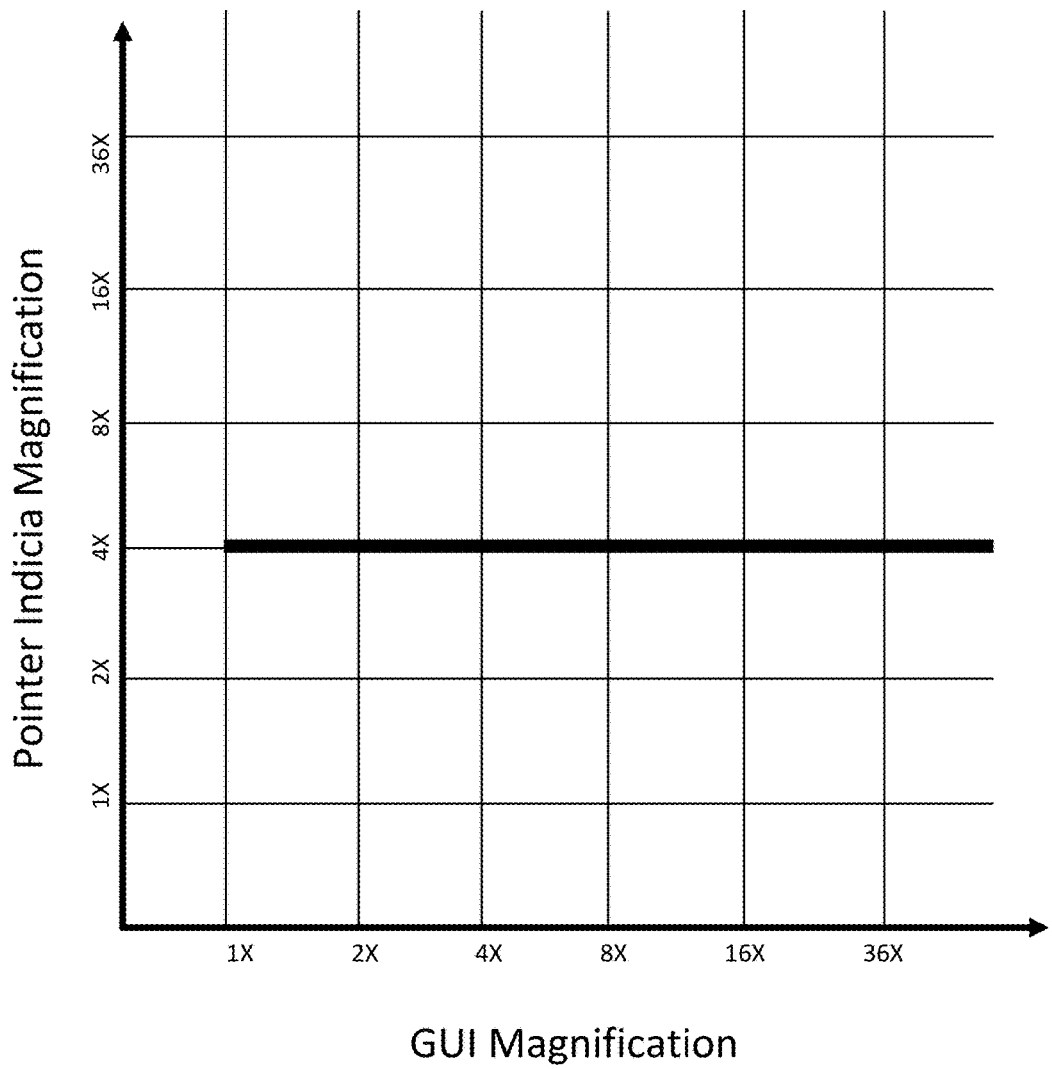
FIG. 9 is a line graph showing pointer indicia remaining statically enhanced at 4-fold magnification regardless of the magnification level of the GUI.

An alternative embodiment of the invention is shown in FIG. 9 wherein regardless of GUI magnification, pointer indicia is always magnified at 4×. This is static magnification of the pointer indicia.

Figure 10:
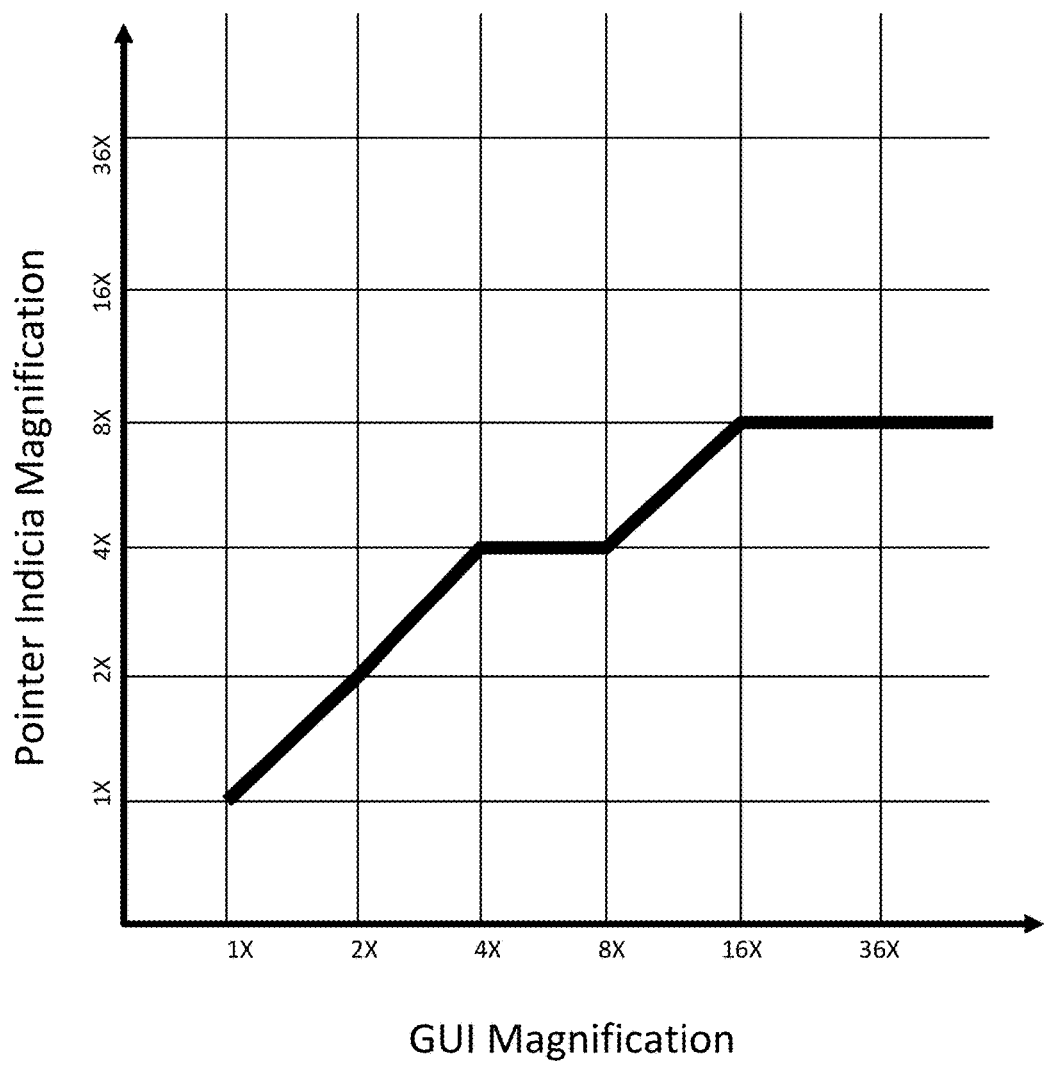
FIG. 10 is a line graph showing pointer indicia synchronized with GUI magnification at a 1-to-1 ratio until GUI reaches an 8-fold magnification level.

In FIG. 10, pointer indicia and GUI magnification are synchronized in a 1-to-1 relationship up to a 4-fold magnification. After 4-fold magnification, pointer indicia and GUI utilize a second synchronization scheme wherein pointer indicia is magnified in a 1-to-2 relationship with GUI. For example, when GUI is magnified 8-fold, pointer indicia is magnified to 4×. When GUI is magnified to 16-fold, pointer indicia is magnified to 8×. However, beyond 16-fold GUI magnification, pointer indicia remains at 8× magnification (its ceiling value).

Figure 11:
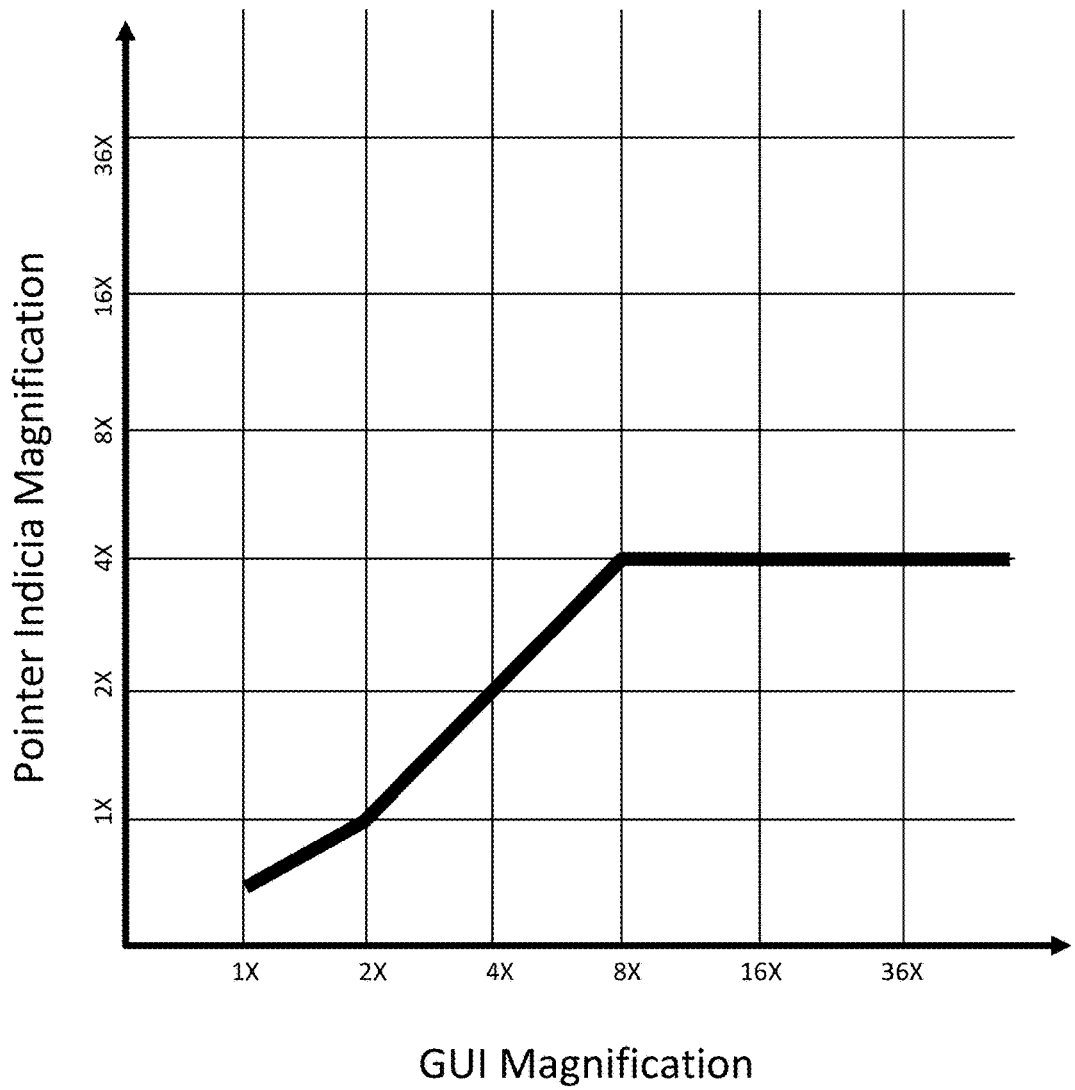
FIG. 11 is a line graph showing pointer indicia synchronized with GUI magnification at a 1-to-2 ratio until pointer indicia reaches a 4-fold magnification ceiling.

In FIG. 11, pointer indicia is magnified at 0.5× while GUI is at 1-fold magnification. Synchronization in this example is at a 2-to-1 relationship between GUI and pointer indicia. When GUI is at 2-fold magnification, pointer indicia is at 1×. When GUI is at 4-fold magnification, pointer indicia is at 2×. When GUI is at 8-fold magnification, pointer indicia is at 4×. At GUI magnification levels beyond 8-fold, synchronization is decoupled and pointer indicia remains at its ceiling value of 4×.

Figure 12:
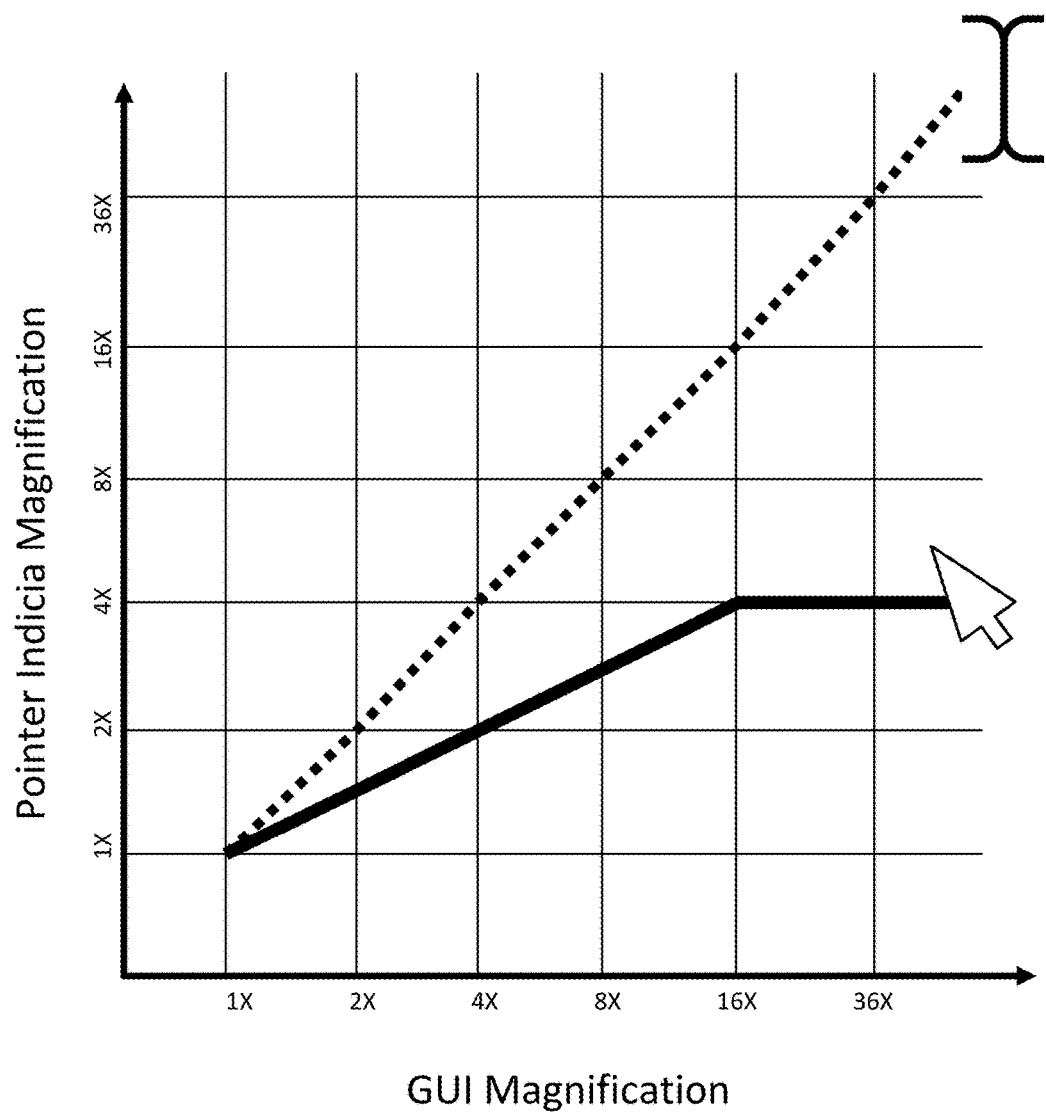
FIG. 12 is a line graph showing mouse cursor linearly reaching a 4-fold magnification ceiling while caret continues on a 1-to-1 magnification synchronization with GUI.

In FIG. 12, two synchronization schemes are provided: (1) a first for a mouse cursor (solid line); and (2) a second for a caret. Caret magnification remains indefinitely synchronized with GUI magnification. This might be preferable when editing highly enlarged text. However, the mouse cursor is synchronized on a reduced magnification relationship with respect to GUI until its ceiling value is reached at 16-fold GUI magnification. It should be noted that a floor value may also be imposed against pointing indicia whereby magnification level of the pointing indicia is not reduced even though GUI magnification level is lowered.

Figure 13:
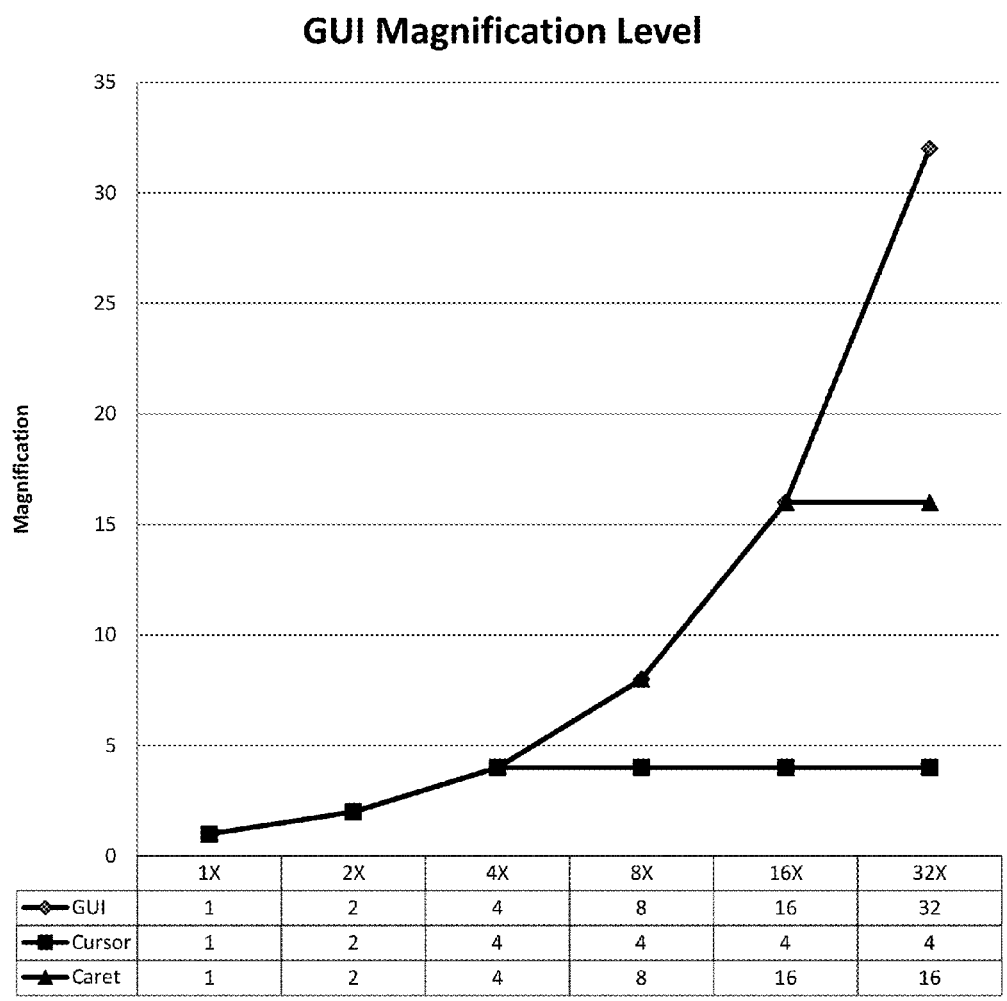
FIG. 13 is a line graph showing cursor and caret magnification ceilings at various levels of GUI magnification.

In FIG. 13, distinct synchronization schemes for mouse cursor (■) versus caret (▲) are shown against GUI magnification (♦). Mouse cursor (■) hits a ceiling at 4-fold magnification while caret (▲) hits a ceiling at 16-fold GUI magnification.

Figure 14:
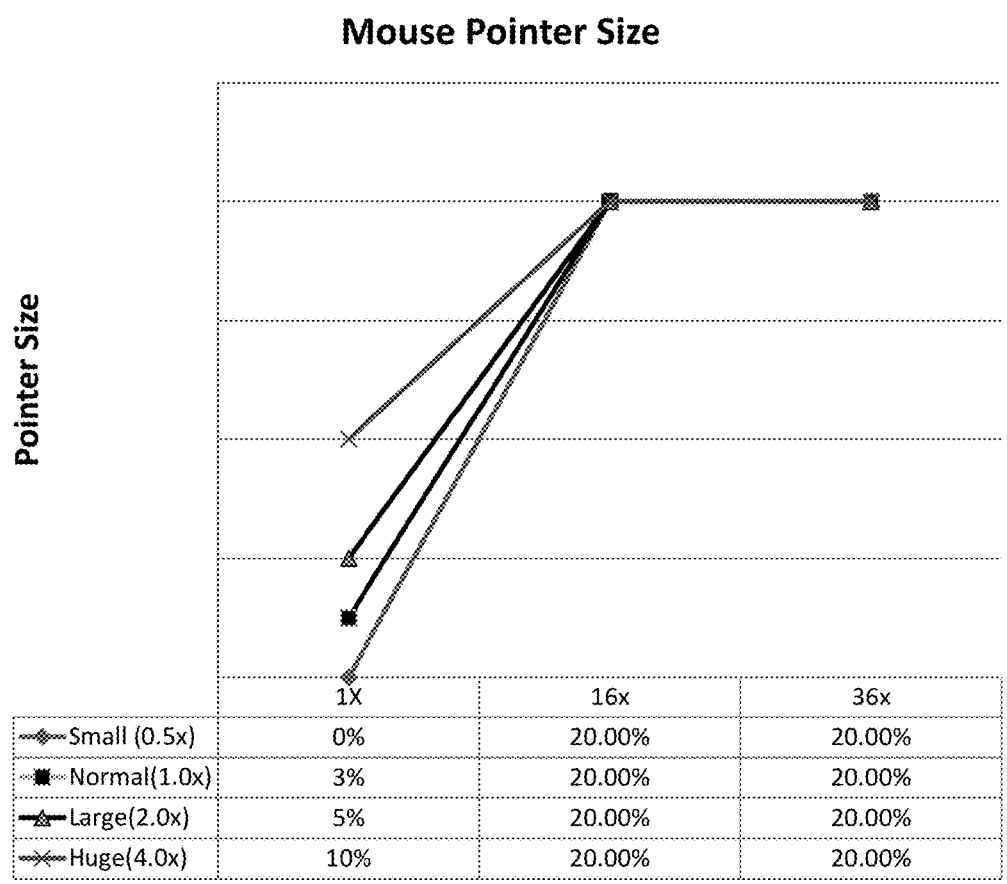
FIG. 14 is a line graph showing convergence of pointer size at a 16-fold GUI magnification wherein the four pointers started at different magnification levels.

FIG. 14 illustrates a convergence graph showing four (4) different pointer sizes denoted as small (♦), normal (■), large (▲) and huge (x). Small pointer size value is 0.5×. Normal pointer size value is 1.0×. Large pointer size value is 2.0×. Huge pointer size value is 4.0×. At a 1-fold magnification of the GUI, small, normal, large and huge pointer sizes cover an area of the GUI of ~0%, 3%, 5% and 10% respectively. As magnification of the GUI is increased, the variation in pointer sizes would produce drastically different user experiences. However, under an embodiment of the present invention, these pointer sizes are normalized (hit their ceiling value) at a 16-fold GUI magnification. As the GUI is magnified from 1-fold to 16-fold, small pointer size is increased substantially more relative to huge pointer size.

Pointing indicia magnification levels according to the invention may be overridden by user events. For example, holding down one or more keys on the keyboard and scrolling a mouse wheel may zoom in and out the mouse cursor while keeping the magnification level of the GUI constant. Holding down an alternate set of keys and scrolling the mouse wheel may zoom in and out the GUI while keeping the mouse cursor at the same magnification. Yet another keystroke or keystroke combination may decouple or re-couple the pointing indicia and GUI magnification synchronization.

Figure 15:
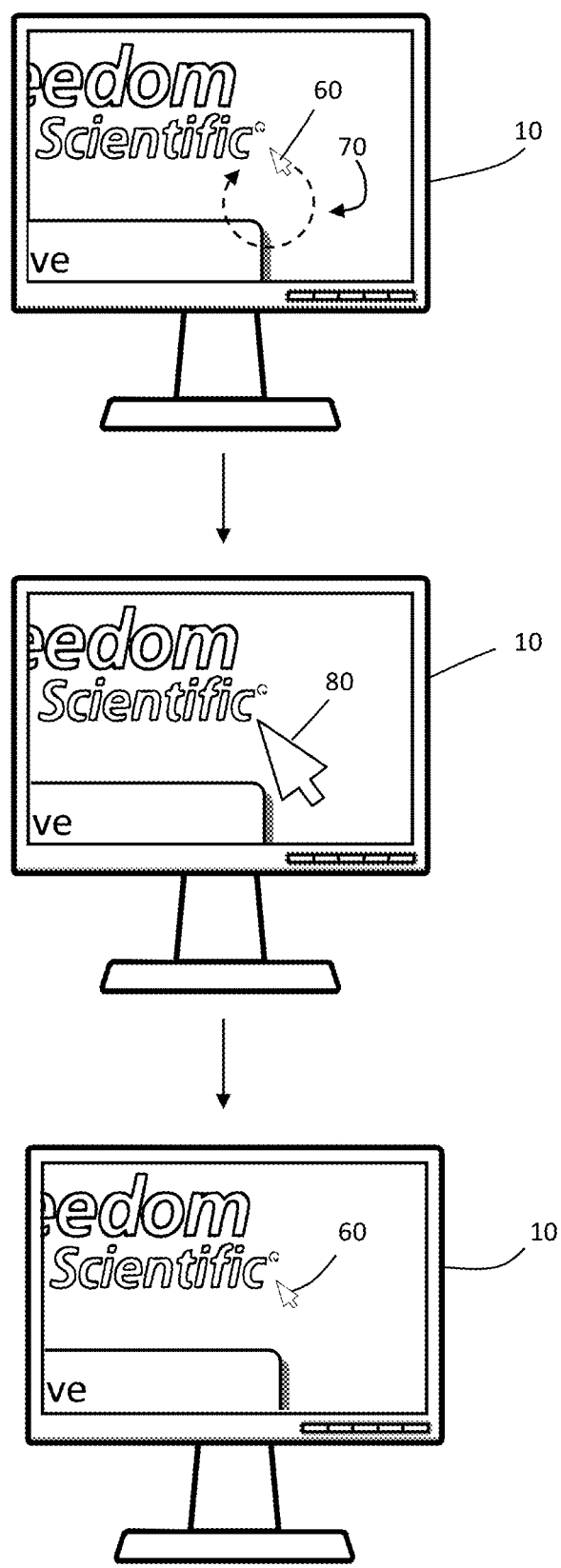
FIG. 15 is a conceptual sequence of displays showing circular pointer movement following a period of pointer inactivity to temporarily magnify pointer.

In yet another embodiment of the invention, erratic mouse movements following a period of mouse inactivity act to temporarily magnify the mouse cursor so that it can be easily located by the low vision user. Erratic movement may include, but are not limited to, rapid side-to-side movement and circular movement. In FIG. 15, mouse cursor 60 displayed on GUI 10 is moved in circular motion 70 after a period of mouse inactivity. Magnification is applied to display enlarged mouse cursor 80 for a three-second interval before magnification is released to again display mouse cursor 60 at its previous magnification level.

Figure 16:
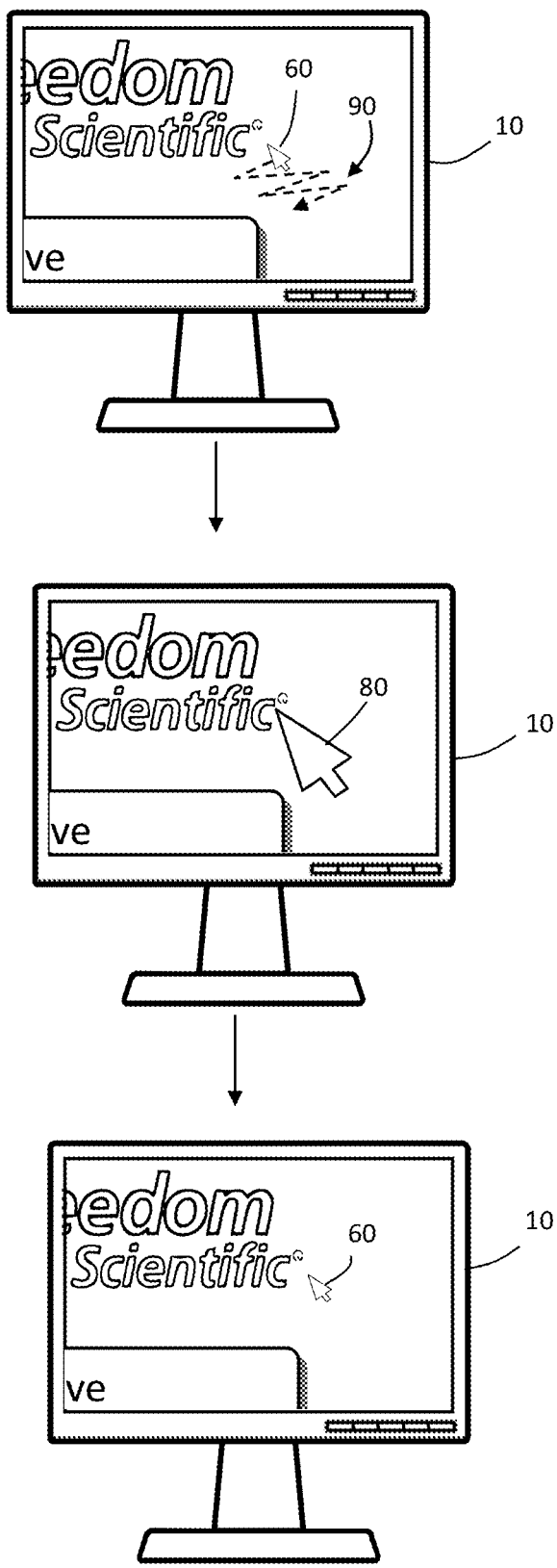
FIG. 16 is a conceptual sequence of displays showing zigzag pointer movement following a period of pointer inactivity to temporarily magnify pointer.

In FIG. 16, mouse cursor 60 displayed on GUI 10 is moved in a zigzag motion 90 after a period of mouse inactivity. Magnification is applied to display enlarged mouse cursor 80 for a three-second interval before magnification is released to again display mouse cursor 60 at its previous magnification level.

Figure 17:
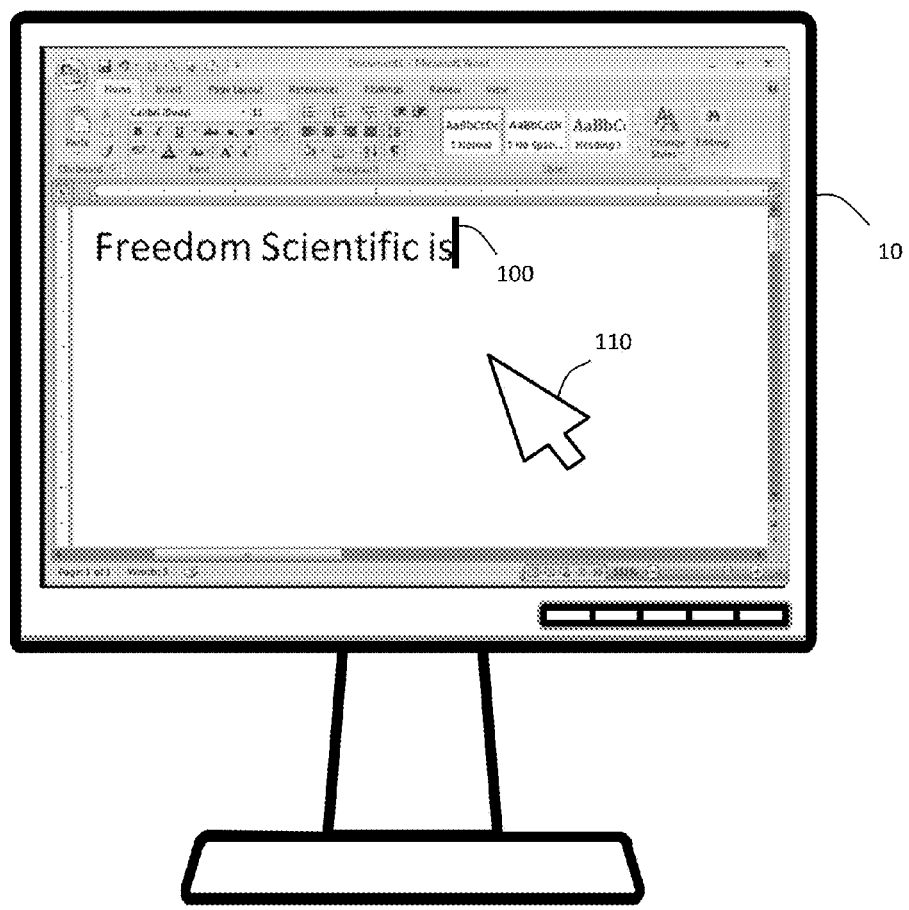
FIG. 17 is a conceptual sequence of displays showing a lesser caret magnification level compared with a greater cursor magnification level.

In FIG. 17, different synchronization schemes for caret 100 and mouse cursor 110 are shown. GUI 10 is 2-fold magnified. Cursor 100 is likewise magnified at 2× while mouse cursor is magnified at 4×.

Figure 18:
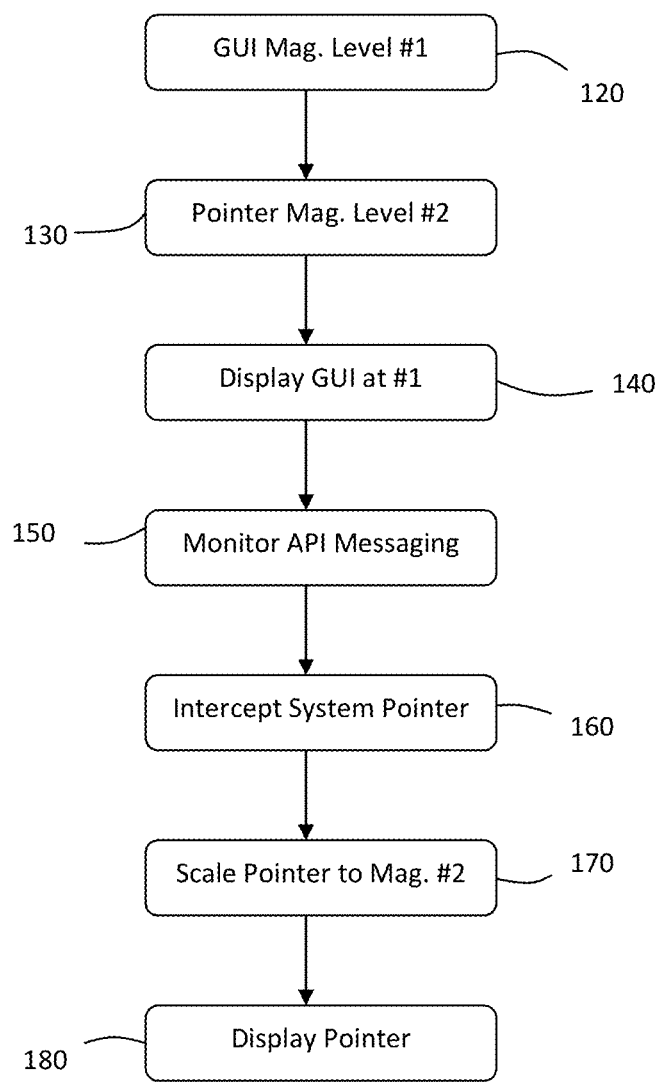
FIG. 18 is a diagrammatic view of an embodiment of the invention wherein the GUI magnification level and the pointer magnification level are manually set.

FIG. 18 illustrates the steps to an embodiment of the invention including establishing a first GUI magnification level 120, establishing a second magnification level for a pointing indicia 130, displaying 140 the GUI at the first magnification level, monitoring API messaging 150, intercepting a call for a system pointer identifier 160, scaling 170 the pointing indicia to second magnification level 130 and displaying the pointing indicia 180. First GUI magnification level 120 occurs either by user-initiated input or by initialization at the operating system level or by a separate magnification application such as MAGIC. First GUI magnification level 120 may also be set responsive to a change in application focus (i.e., from a spreadsheet application to a word processing application).

A monitoring application or worker thread notifies a mouse handling subsystem of the screen magnification change. The pointer subsystem may calculate the mouse cursor magnification based on the following metrics and processes: (A) Compute the base mouse cursor size, relative to unmagnified system metrics. For example, the user selects 150% base mouse cursor scale. The base size of the mouse cursor would be 1.50×32 pixels=48×48 pixels in size. (B) Compute the convergence point size. In the case of a 1024×768 display size, and assuming a maximum convergence scale of 33% of minor dimension (768 pixels), then the maximum mouse size is 768/3=256 pixels. The convergence magnification is the screen magnification level at which the mouse cursor stops scaling. In this example, the default value of 16× magnification is presumed. That means that at 16× magnification, and for any magnification level beyond 16×, the mouse cursor will be contained within a 256×256 pixel bounding box. (C) Linearly interpolate the per-magnification level pixel modifier–the amount that the mouse cursor bounding box grows for each magnification level between 1× (unmagnified) and 16× (convergence magnification). The general formula is (Max size–computed base size)/(number of magnification levels beyond 1×). In the previous example it is (256−48)/15, or 13.866 pixels. So for every magnification level beyond 1×, an additional 14 pixels are added to each dimension of the mouse cursor bounding box. (D) Add a multiple of the magnification level pixel modifier and the magnification level beyond 1× to the computed base mouse metric (48×48). If in this example the GUI is set to 5× magnification, then the mouse cursor would occupy the following bounding box: 48+(4×13.866)=approximately 103 pixels—which is quite different from and more usable than the 160×160 pixels it would have occupied had the mouse cursor scaling been bounded 1:1 to that of the desktop (32×5=160).

For any mouse event from the system (intercepted by the magnification display driver), or for any desktop rendering event that could involve the mouse cursor, the magnification engine tells the pointer subsystem to draw itself. The pointer subsystem queries the system for the current mouse cursor (by handle or other identifier). The pointer subsystem tries to find a cached, vector-sourced substitute. If it finds one it sets it to be the current, internal mouse cursor. If it fails to find one it copies, edge-smoothes, and caches a scaled version of the mouse cursor that is currently the active one, and associates it (by handle or other identifier) for future use in a separate lookup table. It sets this newly created and cached raster-sourced image as the current, internal mouse cursor.

The pointer subsystem renders the current, internal mouse cursor to an off-screen image, at a preselected location. That image is ultimately rendered by the magnification subsystem onto the display driver surface.

When a user purposely manipulates the mouse cursor scale independently from the screen magnification, the user can manipulate: (1) the mouse cursor base scale, which would have the result of increasing the final mouse cursor size according to some inverse of the magnification level, between 1× and the convergence magnification. Once the user is at the convergence level, using this method, the user could only decrease the mouse cursor size. The magnitude of the mouse cursor's size change at 1× is significantly more that it would be at 14×. This relationship is shown in FIG. 14. (2) A multiple, which may be derived from either a fixed, linear, logarithmic, or other mechanism, that is based on mouse cursor and/or desktop magnification—all which may or may not be allowed to exceed the convergence maximum size.

Cursors and carets may be independently configured. The monitoring application intercepts or polls the operating system for the type of pointer deployed (i.e., cursor or caret) and the pointer subsystem renders cursor according to a cursor configuration or the caret according to a caret configuration. The configuration for cursor and carets may be controlled by the magnification engine automatically and/or set by the user. The magnification engine includes one or more display dialog boxes for individually adjusting cursor and caret settings (along with other magnification preferences). These settings are stored in user configuration files such as a registration, INI file, XML file or the like for later retrieval and use.

Figure 19:
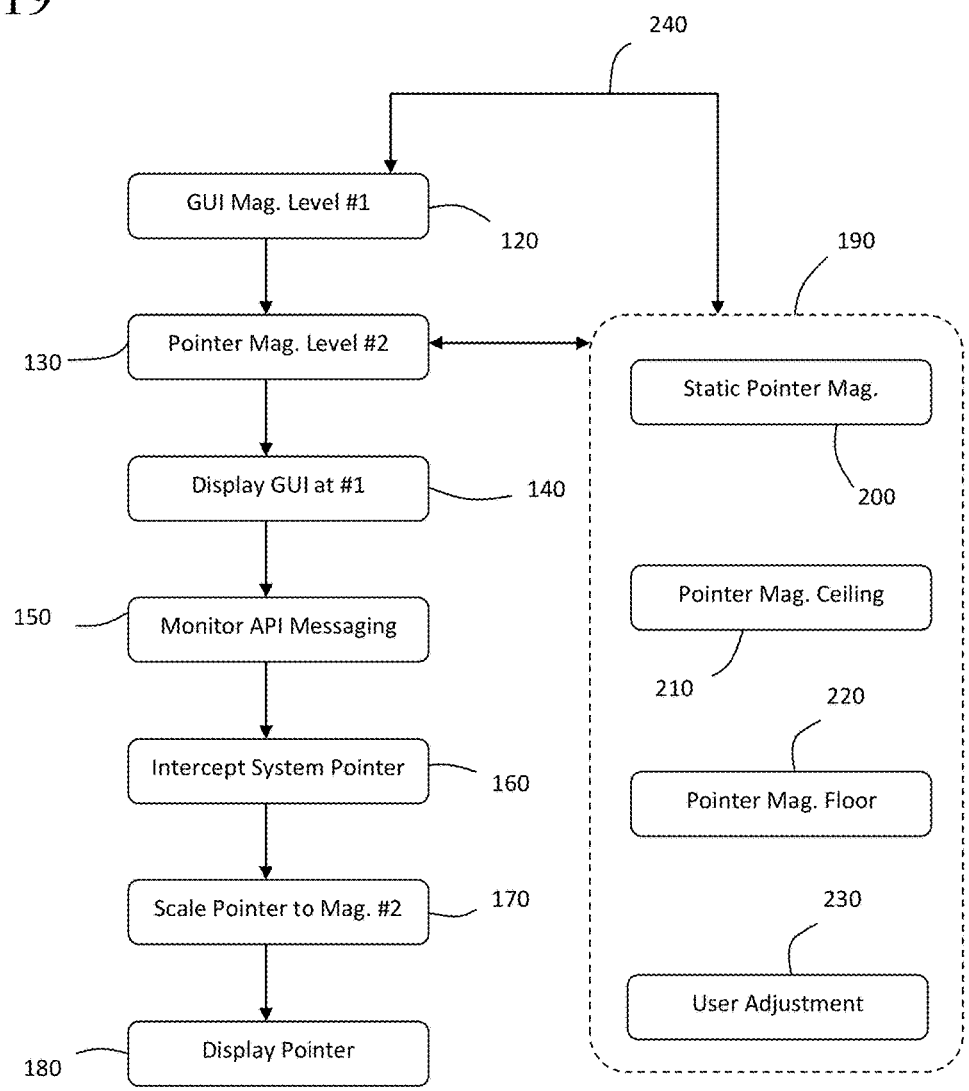
FIG. 19 is a diagrammatic view of an embodiment of the invention wherein wherein the pointer magnification level is set by a number of possible options, some dynamic and some static.

An alternative embodiment of the invention is shown in FIG. 19, the steps include establishing a first GUI magnification level 120, establishing a second magnification level for pointing indicia 130. Second magnification level 130 is selected from magnification scheme array 190 including static pointer magnification 200, pointer magnification ceiling 210, pointer magnification floor 220, and direct user adjustment 230. Magnification scheme array 190 comprises a collection of object properties and settings for the various possible magnification possibilities. The object properties are typically stored on magnetic mediums such as a local hard drive for later recall. The object properties may be saved in various formats, including, but not limited to, system registration, INI, XML, database and the like. The user may switch from one magnification scheme to another responsive to conditions such as an application changing focus. The user may also switch schemes based on user input such as a keystroke or mouse event. Second magnification level 130 may also be calculated 240 based on the surface area of the intercepted system pointer 160 that would cover GUI. For example, second magnification level for a pointing indicia 130 may be calculated so that the pointing indicia overlays twenty (20%) percent of the entire GUI surface area of the display. For example, a desktop that is 680×480 pixels has an area of 307,200 square pixels. A pointer magnified to utilize 61,440 pixels would constitute twenty percent of the total desktop area and thus be considered a "ceiling value" to the pointer size. In yet another embodiment of the invention, the convergence point is calculated based on a percentage of screen area according to the minor screen dimension. By using the minor screen dimension, the convergence value achieves a reasonable behavior when performing in largely disproportionate screens. For example, a monitor that displays a native resolution of 1360×768 pixels yields a major dimension almost 2× that of the minor. In conditions like these, it's preferable to use the minor dimension since that ensures that the convergence value will never exceed any dimension of the display, unless explicitly requested by the user. In the above example, a convergence value of 60%, based on the major dimension, would in fact be 816 vertical pixels and exceed the whole of the minor screen dimension.

Figure 20:
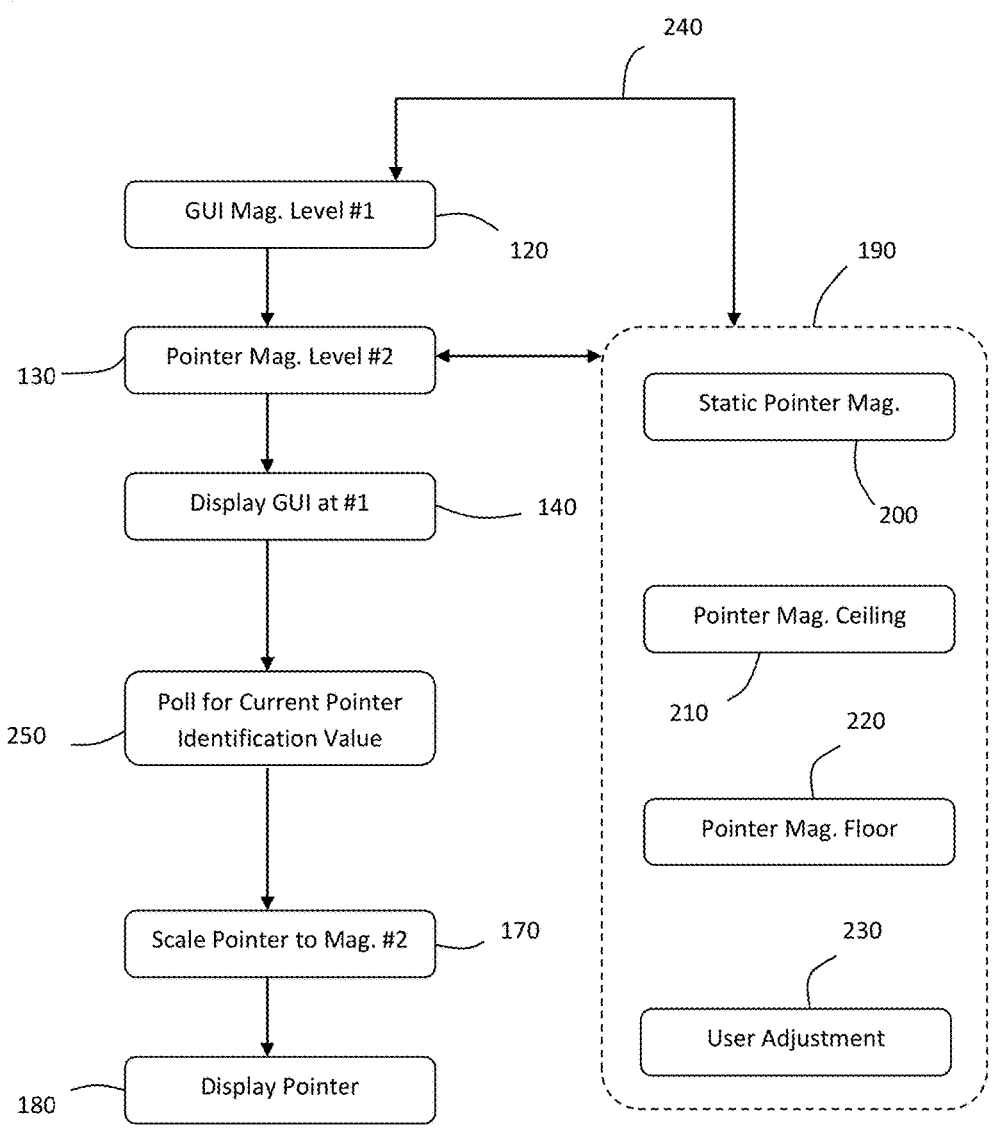
FIG. 20 is a diagrammatic view of an embodiment of the invention wherein instead of monitoring API messaging, the operating system is polled for the current pointer identifier.

FIG. 20 illustrates yet another alternative embodiment of the invention. Under certain situations intercepting the system pointer identification by monitoring API messaging may not be possible or not preferred. In those cases, the operating system and/or application itself is polled 250 for the current pointer identification value.

Figure 21:
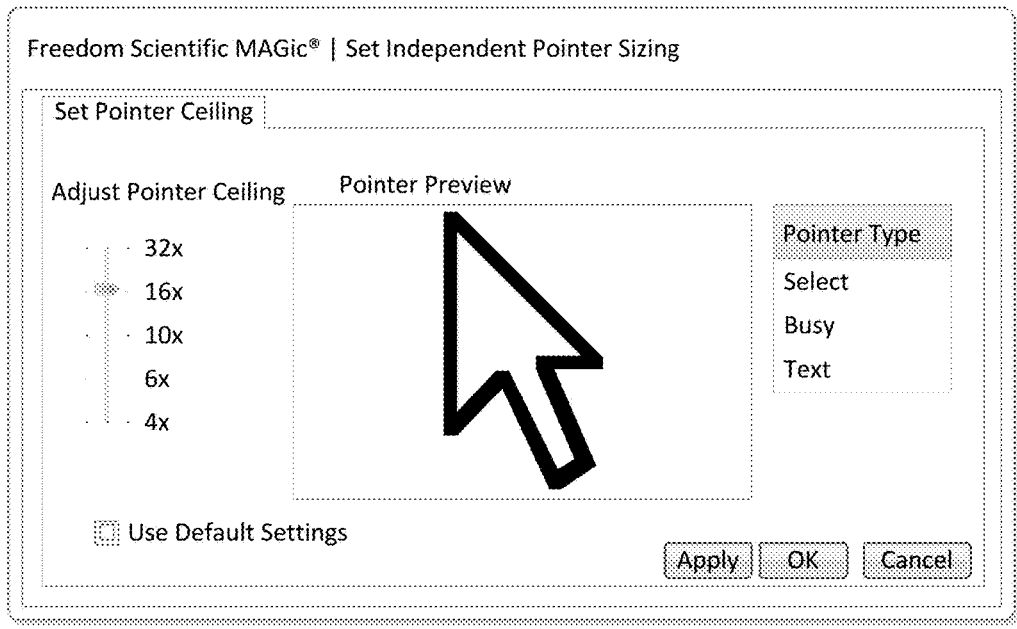
FIGS. 21-26 are conceptual graphic user interface dialog boxes showing a number of embodiments of end-user adjustment of the independent pointer sizing.

FIG. 21 illustrates a dialog box displayed for a low-vision end user seeking to adjust the settings of the pointer ceiling. A moveable slider on the left side of the dialog box moves between 32× at the top and 4× on the bottom. These magnification factors are arbitrary for this example and may vary linearly, by scale and logarithmically. A pointer preview window in the middle of the dialog box illustrates how large the pointer will appear as the moveable slider is adjusted. A default settings checkbox at the lower left of the dialog box allows an end user to return to the preselected settings established by the software developer. On the right side of the dialog box, a listbox is provided having three rows: (1) Select; (2) Busy; and (3) Text. These row descriptions correspond to the type of pointer that is currently being adjusted. In the FIG. 21 example, the "Select" row is active thereby showing the "Select" type pointer in the preview window. Three button components are provided at the lower right corner of the dialog box: (1) Apply; (2) OK; and (3) Cancel which fire events to apply the setting immediately, apply the setting and close the dialog box, or not apply the setting and close the dialog box respectively.

Figure 22:
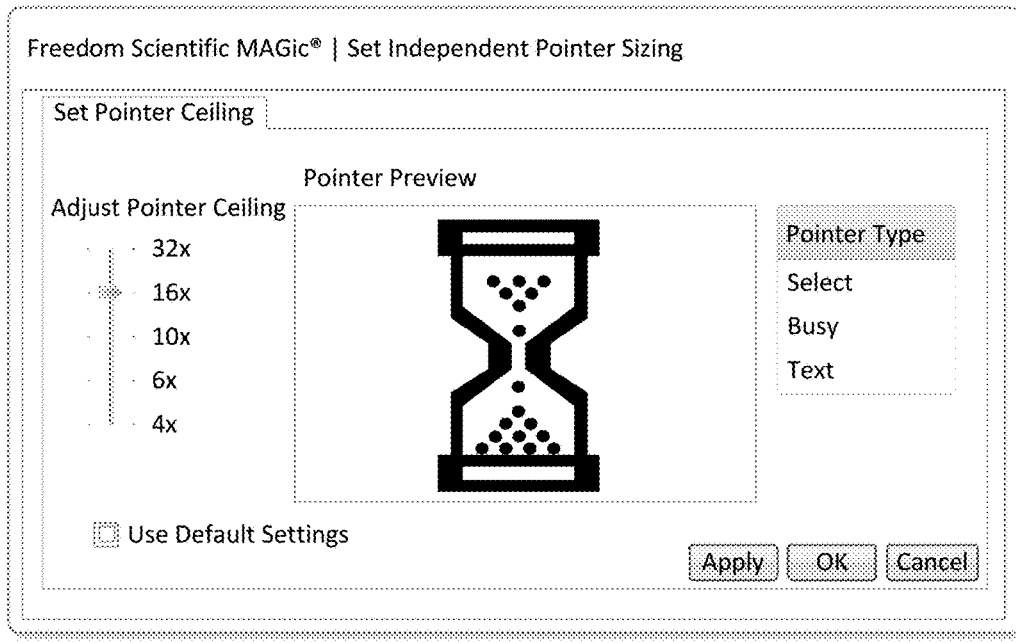
Figure 23:
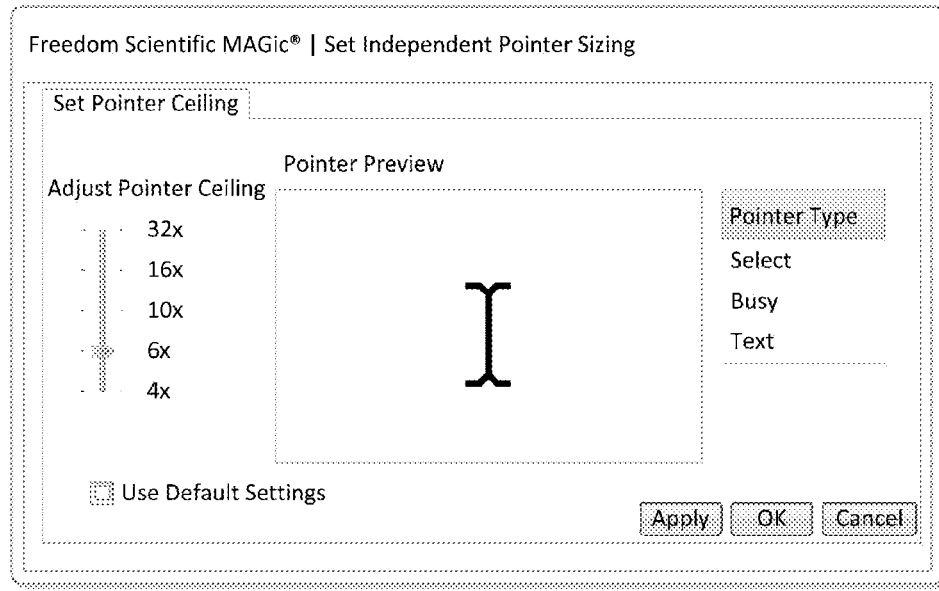

FIG. 22 illustrates the same dialog box as FIG. 21 but in a different state. Namely, the Pointer Type in the list box has been changed to "Busy" which then causes an hourglass pointer preview to be shown. In this case, as was the case in FIG. 21, the end user selected a pointer ceiling value of 16×. Turning to FIG. 23, the dialog box has now been changed to a "Text" pointer type which typically is invoked when the mouse cursor is placed over editable or selectable text such as in a word processing application or over text in a website page. In this case the end user decided to adjust the pointer ceiling value to 6×.

Figure 24:
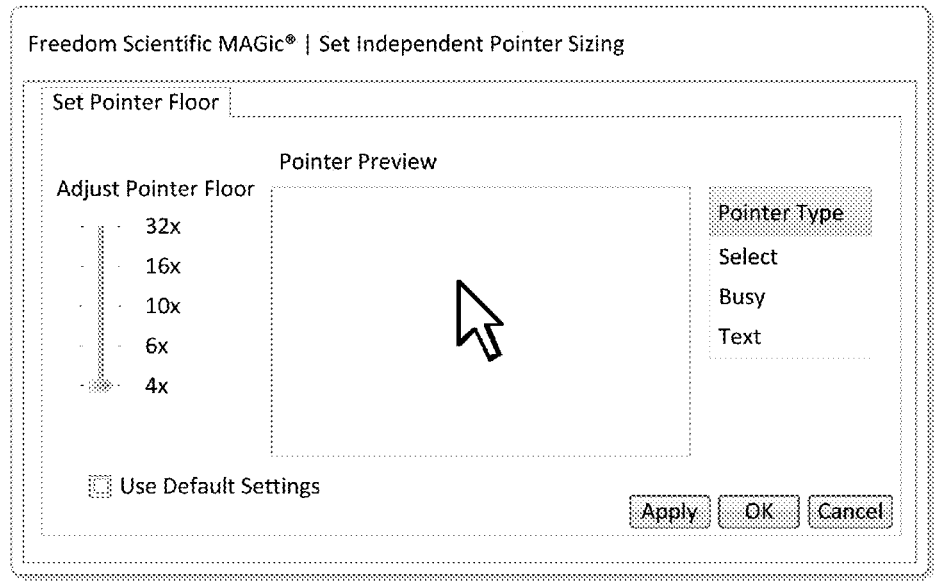

In FIG. 24, the end user sets a pointer floor value which is the smallest the pointer will appear at any magnification level. The pointer floor value in this example is 4× for the "Select" pointer type.

Figure 25:
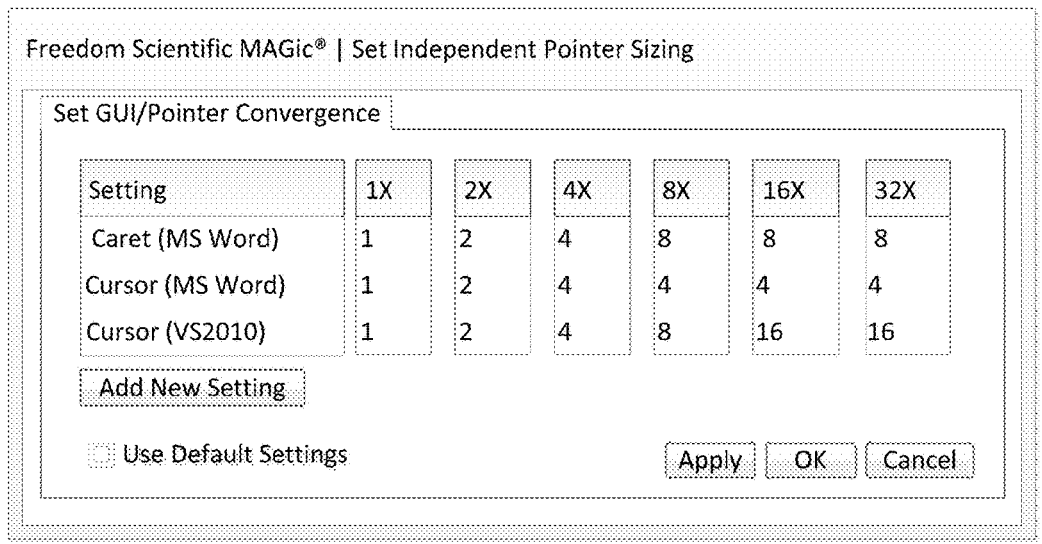

In FIG. 25, convergence values are set for a plurality of different pointers and a plurality of different software applications. For example, when a caret is shown in a MICROSOFT WORD software application when the GUI is at 8× magnification the caret is also magnified to 8×. However, when the GUI magnification is increased in 16× or 32×, the caret shown in MICROSOFT WORD remains at 8× magnification. The magnification of a cursor appearing in MICROSOFT WORD is synchronized with the magnification of the GUI until the GUI magnification exceeds 4×. At that point, the cursor stays at 4× magnification while the GUI can continue to increase in magnification. Finally, a cursor appearing in MICROSOFT VISUAL STUDIO 2010 is magnified at the same level as the GUI until the GUI exceeds 16× magnification. Therefore, it can be seen that when the GUI is at 32× magnification the cursors appearing in MICROSOFT VISUAL STUDIO 2010 remain at 16×. Underneath the listbox showing these various settings a button is provided to add new settings that may vary based on the software application, by specific dialog boxes invoked by the operating system API, by the type of pointer, by the pointer set currently used, and the like.

Figure 26:
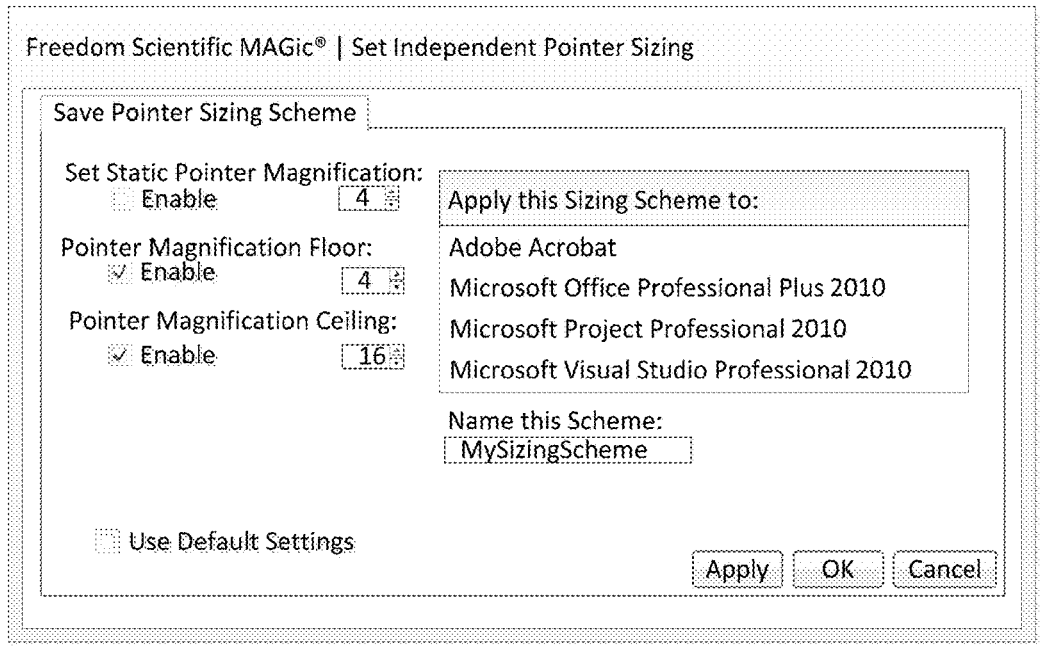

FIG. 26 shows a dialog box interface for saving a user-defined pointer scheme. In this example, an option exists to set a static pointer magnification level. A text box is provided linked to a spinner may increment or decrement the magnification integer value in the text box. This may be also be stepped so instead of incrementing by values of 1 it may increment in magnification steps (i.e., from 1×, 2×, 4×, 8×, 16×, and so on). The end user in this case may not want to have a static pointer magnification value wherein regardless of the GUI magnification level the pointer magnification stays the same. Therefore, there is a checkbox underneath the static pointer magnification value setting to enable (if checked) or disable (if unchecked) this feature. In this example, the end user decided to set a pointer magnification floor of 4× and a pointer magnification ceiling of 16×. Underneath the floor and ceiling values were checkboxes to enable these features (floor and ceiling) independently. A list box is provided to select one or more software applications to apply this pointer sizing scheme to. Four applications are listed: (1) ADOBE ACROBAT; (2) MICROSOFT OFFICE PROFESSIONAL PLUS 2010; (3) MICROSOFT PROJECT PROFESSIONAL 2010; and (3) MICROSOFT VISUAL STUDIO PROFESSIONAL 2010. The end user selected only MICROSOFT OFFICE PROFESSIONAL PLUS 2010 and MICROSOFT PROJECT PROFESSIONAL 2010 to apply this scheme to. Finally, the end user is provided a text box in which to name the scheme. The string "MySizingScheme" is entered into the text box. This scheme may be saved in any number of formats available under the current state of the art for storing user settings. These formats may include, but are not limited to, INI files, XML files, registry keys, database fields or proprietary file formats as preferred by the developer.

It should be noted that in addition to a method, an embodiment of the invention may include one or more non-transitory tangible computer-readable media having computer-executable instructions for performing a method of running a software program on a computer, the computer operating under an operating system. In such an embodiment, the method may include, for example, issuing instructions from the software program which include establishing a first magnification level for the GUI, establishing a second magnification level for a pointing indicia, displaying the magnified GUI at the first magnification level, monitoring application program interface messaging, intercepting a call for a system pointer identifier, scaling the pointing indicia to the second magnification level and displaying the pointing indicia. In other embodiments, various other aspects of the methods described above may be included on the non-transitory tangible computer-readable media.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

What is claimed is:

1. A non-transitory computer-readable medium having stored thereon computer-executable instructions that, in response to being executed by a computing device, cause the computing device to perform operations comprising:
   displaying a graphic user interface (GUI) at a GUI magnification level;
   displaying a pointing indicium at a pointing indicium magnification level;
   establishing a convergence value, wherein magnification of the GUI and the pointing indicium is synchronized when the GUI magnification level is below the convergence value and desynchronized when the GUI magnification level exceeds the convergence value;
   concurrently increasing the GUI and the pointing indicium magnification levels until the pointing indicium magnification level reaches the convergence value;
   increasing the GUI magnification level independently of the pointing indicium magnification level when the GUI magnification level exceeds the convergence value, whereby the pointing indicium is displayed at a static size while the GUI is displayed at the GUI magnification level exceeding the convergence value; and
   responsive to GUI magnification level falling below the convergence value, resynchronizing the GUI and the pointing indicium magnification levels, whereby the GUI and the pointing indicium magnification levels are concurrently increased when the GUI magnification level does not exceed the convergence value.

2. The media of claim 1 wherein the synchronization is linear.

3. The media of claim 1 wherein the synchronization is logarithmic.

4. The media of claim 1 wherein the synchronization is established via stepped values.

5. The media of claim 1 wherein the convergence value is derived from a ratio of pointing indicia surface area against graphic user interface surface area.

6. The media of claim 1, wherein the convergence value comprises a first convergence value for a cursor and a second convergence value for a caret.

7. The media of claim 1 further comprising the steps of:
   providing a user-selectable option to decouple the synchronization of the GUI and the pointing indicium magnification levels, whereby the pointing indicium is magnified independently of the magnification level of the GUI; and
   displaying the independently magnified pointing indicia.

8. The media of claim 1 further comprising the steps of:
   detecting the resolution of the minor axis of the graphic user interface as displayed to an end user;
   establishing a convergence scale; and
   dividing the resolution of the minor axis by the convergence scale to compute magnification convergence value.

9. A method of magnifying a graphic user interface and a pointing indicia on an operating system executed by a computer processor, the method comprising:
   displaying the graphic user interface (GUI) and the pointing indicia at a current magnification level;
   establishing a pointing indicia ceiling value for magnification;
   receiving an instruction to increase the current magnification level to a new magnification value;
   magnifying in synchronization both the GUI and the pointing indicia until the pointing indicia ceiling value for magnification is reached;
   responsive to the new magnification value exceeding the pointing indicium ceiling value for magnification, magnifying the graphic user interface independently of the pointing indicium; and
   displaying the GUI at the new magnification value.

10. The method of claim 9 wherein the synchronization is linear.

11. The method of claim 9 wherein the synchronization is logarithmic.

12. The method of claim 9 wherein the synchronization is established via stepped values.

13. The method of claim 9 wherein the pointing indicium ceiling value for magnification is derived from a ratio of pointing indicia surface area against graphic user interface surface area.

14. The method of claim 9, wherein the pointing indicium ceiling value for magnification comprises a first ceiling value for a cursor and a second ceiling value for a caret.

15. The method of claim 9 further comprising the steps of:
   providing a user-selectable option to decouple the synchronization of the GUI and the pointing indicium magnification levels, whereby the pointing indicium is magnified independently of the magnification level of the GUI; and
   displaying the independently magnified pointing indicia.

16. The method of claim 9 further comprising the steps of:
   detecting the resolution of the minor axis of the graphic user interface as displayed to an end user;
   establishing a convergence scale; and
   dividing the resolution of the minor axis by the convergence scale to compute magnification convergence value.

* * * * *